United States Patent
Suzuki et al.

(10) Patent No.: US 6,214,519 B1
(45) Date of Patent: Apr. 10, 2001

(54) OPTICAL RECORDING MEDIUM

(75) Inventors: Yuki Suzuki; Michikazu Horie; Syuichi Maeda; Yutaka Kurose; Yuko Okamoto, all of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/033,654

(22) Filed: Mar. 3, 1998

Related U.S. Application Data

(63) Continuation-in-part of application No. 08/892,338, filed on Jul. 14, 1997, now abandoned, which is a continuation-in-part of application No. 08/701,741, filed on Aug. 22, 1996, now abandoned.

(30) Foreign Application Priority Data

| | | |
|---|---|---|
| Aug. 22, 1995 | (JP) | 7-213501 |
| Sep. 13, 1995 | (JP) | 7-235132 |
| Jan. 16, 1996 | (JP) | 8-004644 |
| Apr. 3, 1996 | (JP) | 8-081398 |
| Jun. 20, 1996 | (JP) | 8-159843 |

(51) Int. Cl.$^7$ .................... B41M 5/26
(52) U.S. Cl. .............. 430/270.16; 430/945; 430/270.19; 430/270.2; 369/275.4
(58) Field of Search ........................ 430/270.16, 270.19, 430/275.1, 270.15, 945, 270.18, 270.2; 369/275.4, 275.1

(56) References Cited

U.S. PATENT DOCUMENTS

| | | | |
|---|---|---|---|
| 4,412,231 | 10/1983 | Namba et al. | 430/945 |
| 4,686,143 | 8/1987 | Yoshikawa et al. | 346/135.1 |
| 5,231,173 | 7/1993 | Murayama et al. | 534/704 |
| 5,298,608 | 3/1994 | Murayama et al. | 430/270.16 |
| 5,330,546 | 7/1994 | Ramesh et al. | 44/620 |
| 5,389,419 | 2/1995 | Maeda et al. | 430/270.19 |
| 5,447,823 | 9/1995 | Ochiai et al. | 430/945 |
| 5,532,342 | 7/1996 | Ochiai et al. | 430/945 |
| 5,592,464 | 1/1997 | Sugaya et al. | 369/225.4 |
| 5,633,106 | 5/1997 | Aihara et al. | 430/270.16 |
| 5,659,354 | * 8/1997 | Teraskai et al. | 369/121 |
| 5,764,619 | * 6/1998 | Nishiuchi et al. | 369/275.1 |

FOREIGN PATENT DOCUMENTS

| | | | |
|---|---|---|---|
| 4-361088 | * 12/1992 | (JP) | 430/270.16 |
| 05279580 | 10/1993 | (JP) | |
| WO91/18950 | * 12/1991 | (WO) | |

OTHER PUBLICATIONS

Solomons, T.W. Graham, "Organic Chemistry" 1984, pp. 485–489.
U.S. application No. 09/422,074, filed Oct. 21, 1998, pending.

* cited by examiner

Primary Examiner—Martin Angebranndt
(74) Attorney, Agent, or Firm—Oblon, Spivak, McClelland, Maier & Neustadt, P.C.

(57) ABSTRACT

An optical recording medium comprising a transparent substrate and at least a recording layer containing an organic dye, a reflecting metal layer and a protective layer sequentially laminated on the substrate in this order, which has the following characteristics (a) to (c):

(a) the substrate has a tracking groove with a track pitch of from 0.7 to 1.0 μm and the recording layer shows a modulation amplitude of EFM signal of at least 50% when recording is carried out by a laser beam with a wavelength of from 600 to 700 nm, and has a reflectance of from 45 to 65%;

(b) in a thermogravimetric analysis of the dye, the inclination of the weight reduction to the temperature in the main weight reduction process is at least 2%/°C.; and (c) in the thermogravimetric analysis of the dye, the total weight reduction in the main weight reduction process is at least 25%.

25 Claims, 15 Drawing Sheets

OPTICAL RECORDING MEDIUM

This application is a continuation-in-part application of the application Ser. No. 08/892,338 having a filing date of Jul. 14, 1997 now abandoned which is a continuation-in-part application of the application Ser. No. 08/701,741 having a filing date of Aug. 22, 1996 now abandoned.

BACKGROUND OF THE INVENTION

1. Field of the Invention

The present invention relates to an optical recording medium.

2. Discussion of Background

In recent years, an attention has been drawn to shortening the oscillation wavelength of a laser beam for high density recording, and an optical recording medium has been desired which is useful for recording and reproducing by a laser beam with a wavelength shorter than 780 nm or 830 nm, for example, with a wavelength of 640 nm. Under such circumstances, various recording media are available, but among them, an organic dye type optical recording medium has a merit that it is inexpensive and easy from the viewpoint of its production process.

As an organic dye type optical recording medium, an optical disc (CD-R) of the type which is compatible with CD, has already been practically developed which is operable by a laser beam with a wavelength of 780 nm. On the other hand, various proposals have been made for organic dye-type media for short wavelength application, such as those disclosed in Japanese Unexamined Patent Publications No. 74690/1992, No. 238036/1992 and No. 38878/1993. Further, many cyanine type dyes have recently been proposed, such as those disclosed in Japanese Unexamined Patent Publications No. 336086/1994, No. 76169/1995, No. 125441/1995, No. 262604/1995 and No. 266705/1995. However, these proposals are nothing more than mere application of the knowledge of CD-R at a wavelength of 780 nm to a shorter wavelength use, and they do not give any specific requirements to realize high recording density by making small sizes of written marks, which is a merit in shortening the operation wavelength.

Further, with respect to the shape of a groove, Japanese Unexamined Patent Publications No. 358331/1992, No. 198013/1993, No. 2771/1993, No. 109441/1992 and No. 22224/1991 are, for example, available, and they give some knowledge with respect to a wavelength around 780 nm, but they do not teach shortening of the wavelength.

In the recording at 780 nm, absorption and reduction in the film thickness due to the thermal decomposition of the dye and deformation due to softening of the substrate take place simultaneously. As the deformation of the record portion extends to the adjacent land portions or as the written mark width is larger, larger recording modulation amplitude can be obtained.

Further, as proposed in Japanese Unexamined Patent Publications No. 243508/1991, No. 50033/1995 and No. 44891/1995, a method has been developed wherein a super saturated absorbing layer is laminated, so that the beam diameter of a reproducing beam itself may be reduced by providing apertures, whereby an adequate degree of modulation can be obtained even with a very small record portion, and a resolution exceeding the spatial frequency limit represented by $\lambda/(2NA)$ can be realized. However, in this method, fairly large absorption is required, and it is therefore difficult to obtain sufficient high reflectivity constantly.

In the above described prior art, a large recording modulation amplitude is obtained by both the decomposition of the dye and the deformation of the substrate. However, in a case where the recording density is to be increased at the same time as shortening the wavelength, for example, by reducing the track pitch to a level of less than 1 $\mu$m, the deformation of the record portion tends to be too large and brings about a serious problem of crosstalk. This brings about a serious problem especially when recording is carried out in a groove. Further, reproduction is carried out at a wavelength shorter than the wavelength for CD-R and yet by means of a laser focusing lens having a large number of apertures (NA). Accordingly, as compared with 780 nm-NA0.5, in the case of 640 nm-NA0.6, the degree of focusing of the reproducing laser beam increases by 1.46 times. Consequently, the temperature rise and light intensity due to irradiation with the reproducing beam are higher when shorter wavelength laser pick up (drive) is used, so the dye which has high reproducibility is especially required.

Further, according to a conventional groove design, it is common to form written marks larger than the beam diameter at the time of using a laser head having a large number of apertures (NA) for high densification, whereby it has been difficult to obtain high reflective contrast between the written and unwritten portions.

SUMMARY OF THE INVENTION

Under these circumstances, the present inventors have conducted extensive studies and have found that the following construction of the present invention is effective for high density recording by means of a recording/reproducing beam with a short wavelength.

Namely, the present invention provides an optical recording medium comprising a transparent substrate and at least a recording layer containing an organic dye, a reflecting metal layer and a protecting layer sequentially laminated on the substrate in this order, which has the following characteristics (a) to (c):

(a) the substrate has a tracking groove with a track pitch of from 0.7 to 1.0 $\mu$m and the recording layer shows a modulation amplitude of EFM signal of at least 50% when recording is carried out by a laser beam with a wavelength of from 600 to 700 nm, and has a reflectance of from 45 to 65%;

(b) in a thermogravimetric analysis of the dye, the inclination of the weight reduction to the temperature in the main weight reduction process is at least 2%/°C.; and (c) in the thermogravimetric analysis of the dye, the total weight reduction in the main weight reduction process is at least 25%.

Further, the present invention provides an optical recording medium comprising a transparent substrate and at least a recording layer containing an organic dye, a reflecting metal layer and a protecting layer sequentially laminated on the substrate in this order, wherein the recording layer is made of a mixture comprising a main component dye A and a material B, which satisfy the following conditions:

(d) the dye A is such that in its thermogravimetric analysis, the inclination of the weight reduction to the temperature rise in the main weight reduction process is from 0.5%/°C. to 3%/°C., and the weight reduction in the process is from 40 to 55% of the total weight, or the inclination of the weight reduction is from 3%/°C. to 20%/°C., and the weight reduction is at least 30% and less than 50% of the total weight;

(f) the material B is such that in its thermogravimetric analysis, the inclination of the weight reduction to the temperature rise in the main weight reduction process is at least 10%/°C., and the weight reduction in the process is at least 55% of the total weight, or the weight reduction is at least 75% of the total weight;

(g) the dye A shows absorption such that the molar absorbance coefficient ε in a solution is at least 50,000, and the spectral absorption maximum or absorption shoulder closest to a recording/reproduction wavelength in the form of a film on the transparent substrate is located on a wavelength side shorter by from 40 to 60 nm than the recording/reproduction wavelength;

(h) the absorption maximum or absorption shoulder closest to a recording/reproduction wavelength, of the material B in the form of a film, is located on a wavelength side shorter by at least 60 nm than the recording/reproduction wavelength.

BRIEF DESCRIPTION OF THE DRAWINGS

FIG. 15 and FIG. 16 show suitable magnification of vertical and horizontal scale for analysis and our "θ" and "Lp/L" values are introduced by this scale.

DETAILED DESCRIPTION OF THE PREFERRED EMBODIMENTS

In the present invention, the recording layer undergoes a weight reduction and a reduction in the film thickness due to the decomposition of dyes absorbing a laser beam for recording, whereby the complex refractive indices of the dyes will change, the phase of return light will change optical phase shift and the reflectance will change, to form a written mark, and shows a modulation amplitude of EFM signal of at least 50% when recording is carried out by a laser beam with a wavelength of from 600 to 700 nm, and has a reflectance of from 45 to 65%.

Figure 17:
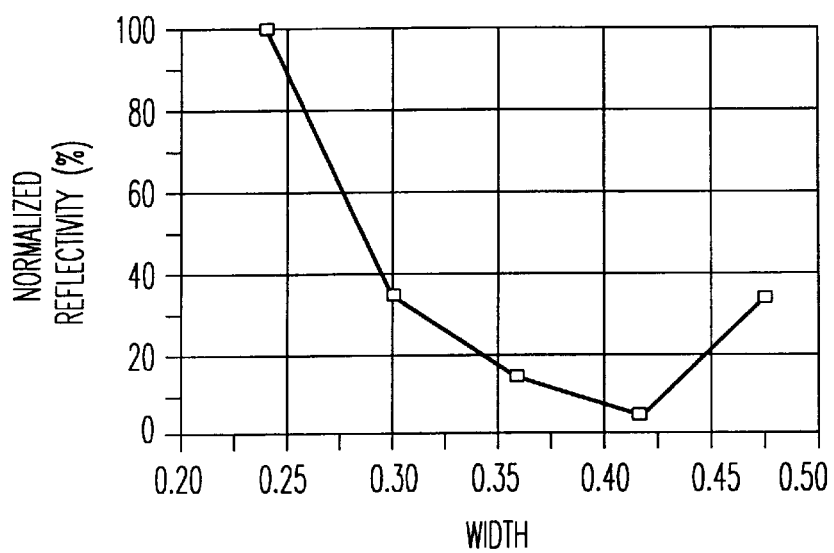
FIG. 17 is a graph showing the relationship between the width of a groove in a recording layer and the normalized reflectivity, obtained by calculation.

In the present invention, as the transparent substrate, a conventional substrate made of e.g. glass or a resin such as polycarbonate, polymethacrylate or amorphous polyolefin, may be employed, and it has a guide groove or tracking groove for servo control. Such a groove usually has a depth of from 100 to 200 nm, preferably from 140 to 200 nm, and the width of the groove is usually from 0.2 to 0.5 μm. The track pitch is usually from 0.7 to 1.0 μm, and the shape of the groove is preferably U-shape. If the depth of the groove is less than 100 nm, no adequate change tends to take place at the time of recording, and no adequate recording modulation amplitude tends to be obtained. If it exceeds 200 nm, the difference in reflectivity between the groove portion and the land portion tends to be too larger and in the case of recording in the groove, the reflectivity tends to be too low. The width of the groove is the width at a half depth of the groove (hereinafter referred to simply as the groove width or the width of the groove). If the groove width is less than 0.2 μm, the transfer ratio of the groove in the substrate tends to be low, such being undesirable. On the other hand, if the groove width exceeds 0.5 μm, the written mark width tends to be large, such being undesirable. FIG. 17 shows the calculation results of the groove width and the normalized reflectivity of a film having a refractive index of 2.4 and an extinction coefficient of 0.08.

In the present invention, a particularly preferred groove shape is such that the track pitch is from 0.7 to 1.0 μm, the groove depth in the substrate is from 0.2 to 0.4 μm, particularly preferably from 0.25 to 0.37 μm, and the inclination of the wall of the groove is from 70° to 85°. These values can readily be determined by optical measurements by means of e.g. a He-Cd laser, and if necessary, can be obtained by STM or AFM.

The recording layer is usually formed by spin-coating a solution having an organic dye or the like dissolved in a solvent such as ethanol, 3-hydroxy-3-methyl-2-butanone, diacetone alcohol or a fluorinated alcohol. As such a solvent, a solvent having a boiling point of from 100° to 180° C. is preferred. Particularly preferred as such a solvent is a fluorinated alcohol having a boiling point of from 110° to 150° C. If the boiling point is lower than 110° C., the solvent evaporates during the spin coating, whereby the coating liquid tends to hardly reach a peripheral portion outside 40 mm in radius of the disc, and the film thickness distribution in the radial direction tends to be large, whereby good properties may not be obtained. On the other hand, if it exceeds 150° C., it takes time for evaporation, and the solvent tends to remain in the film, whereby good recording sensitivity can not be obtained in many cases. While diacetone alcohol or ethyl cellosolve which is frequently used as a solvent other than a fluorinated alcohol, has a contact angle of at least 30° to a polycarbonate as the substrate, the above-mentioned fluorinated alcohol has a contact angle of not higher than 10°, and by virtue of such excellent wettability of the fluorinated alcohol, the coating liquid can sufficiently enter into the groove of a narrow track pitch replica, whereby it is possible to form a film exhibiting excellent recording properties. A ketone solvent or other polar solvents are not preferred, since they dissolve the polycarbonate substrate, and accordingly, it becomes necessary to sputter a dielectric film on the substrate or to use an expensive polyolefin or glass as the substrate, whereby merits of an organic recording medium such as inexpensiveness and easiness of its production process, will be lost.

The thickness of the recording layer is preferably from 60 to 200 nm at the groove portion. If the film thickness is less than 60 nm, the thickness is too thin to obtain good recording sensitivity. On the other hand, if it exceeds 200 nm, the deformation of the written mark width tends to be large, whereby crosstalk or jitter tends to increase. More preferably, the film thickness is from 90 to 180 nm.

Further, the groove of the coating film is preferably a U-shape and has a depth which is from 40 to 75% of the depth of the groove in the substrate. This parameter is rather important to know the film thickness of absorptive layer (recording layer). In this wet coating process such as spin-coating of dye layer, there is difference between the land film thickness and the groove film thickness. In many cases, only land film thickness is referred to. But the film thickness ratio between on land and in groove portion can be changed by groove structure, solvent, spinning speed, dye content and so on in the wet process. So it is difficult to show the film thickness in the groove portion only be referring to the land film thickness. This parameter that is the ratio between the groove depth of replica and the recording layer (dye) groove depth is one of the parameters which show the thickness valance on land and in groove portion. If the depth of the groove of the coating film is less than 40%, it tends to be difficult to obtain an adequate amplitude of a tracking error signal, and if it exceeds 75%, the film thickness at the groove portion tends to be too thin to obtain an adequate recording modulation.

Further, the single layer of this dye layer preferably has a refractive index of from 2.0 to 3.0 and an extinction coefficient of from 0.03 to 0.15, as measured at a wavelength of ±5 nm of the recording/reproducing beam wavelength. If the refractive index is less than 2, no adequate reflectivity or no adequate recording modulation amplitude tends to be obtained. If the extinction coefficient is less than 0.03, no adequate recording sensitivity or no adequate degree of modulation tends to be obtained, and if it exceeds 0.15, no adequate reflectivity tends to be obtained.

The present inventors have found that the thermal properties of the dye constituting the recording layer are substantially influential over the recording properties and that in order to obtain adequate properties for a short wave application, the weight reduction in the main weight reduction process must be sharp to the temperature. Accordingly, in the present invention, a dye of which the inclination of the weight reduction in the main weight reduction process is at least 2%/°C., preferably at least 10%/°C., more preferably at least 13%/°C., most preferably at least 15%/°C., is employed. In the present invention, among several weight reduction processes, a process wherein the weight reduction is at least 18%, is referred to as the main weight reduction process.

Figure 1A:
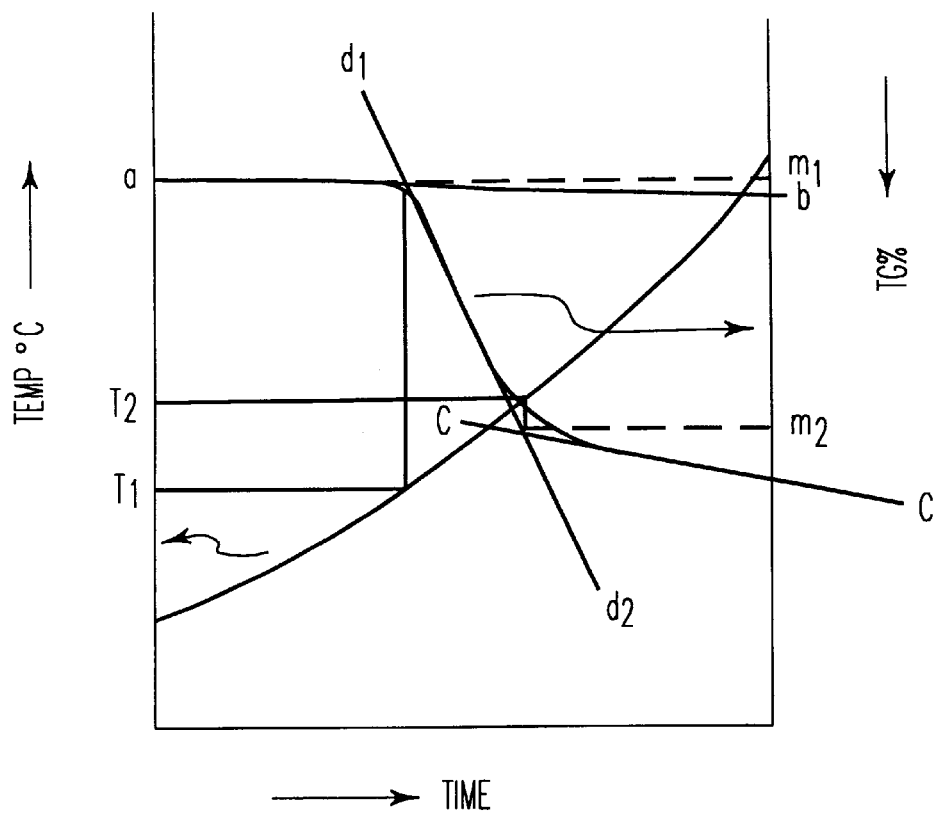
FIGS. 1a and 1b are differential thermobalance charts to be used for explaining the main weight reduction process of the dye and the method for obtaining the total weight reduction and the inclination of the weight reduction in the main weight reduction process.

In the present invention, the inclination of the weight reduction is obtained as follows. (See FIG. 1a.) A material having a mass $M_0$ is heated at a rate of 10° C./min. As the temperature rises, the mass decreases slightly to show a substantially linear weight reduction line a-b at the initial stage and then starts to decrease abruptly showing a weight reduction of at least 18% along a substantially linear line $d_1$–$d_2$. This is the main weight reduction process, and the initiation temperature of the main weight reduction is $T_1$. Thereafter, the weight reduction settles in a weight reduction process shown by a substantially linear line c—c. Here, the inclination of the weight reduction is represented by the following value:

$$(m_1-m_2)\ (\%)/(T_2-T_1)\ (°C.)$$

where $T_2$ is the temperature at the intersection of the linear line $d_1$–$d_2$ and the linear line c—c, $m_2$ is the weight, and ml is the initial weight. If a dye of which this inclination is less than 2%/°C., is employed, the spread of the record portion in the transverse direction tends to be large, and it tends to be difficult to form small pits, such being unsuitable for a short wavelength application intended for high recording density. Further, the total weight reduction in this main weight reduction process is at least 25%, preferably at least 30%, of the initial mass Mo. If the total weight reduction is less than 25%, it tends to be difficult to obtain good recording modulation amplitude or recording sensitivity. Further, the initiation temperature of the main weight reduction is preferably from 250° to 340° C.

Figure 1B:
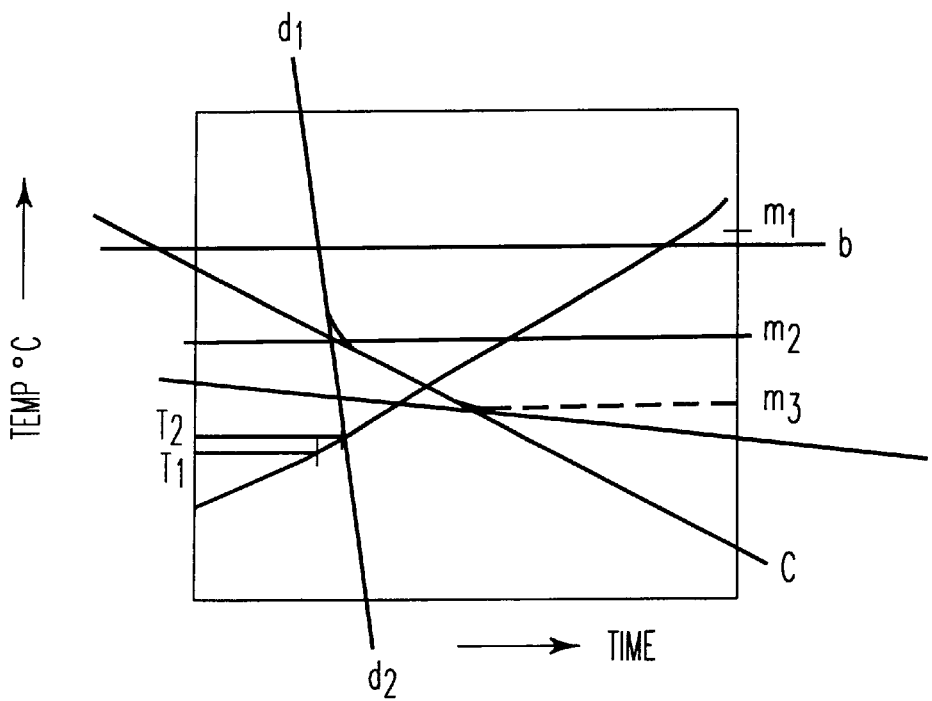

In the case of a material which shows the weight reduction processes as shown in FIG. 1b, $m_1$, $m_2$, $T_1$ and $T_2$ will be as shown in FIG. 1b.

The organic dye may be any dye so long as it satisfies the above requirements. For example, it may be suitably selected from the group consisting of a metal-containing azo dye, a dibenzofuranone dye and a metal-containing indoaniline dye, and two or more of such dyes may be used in combination. Particularly preferred as the organic dye to be used in the present invention, is at least one metal chelate compound made of a compound of the following formula (1) to (6) and at least one metal selected from the group consisting of nickel, cobalt and copper.

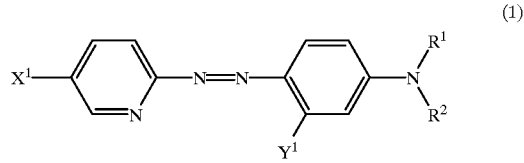

(1)

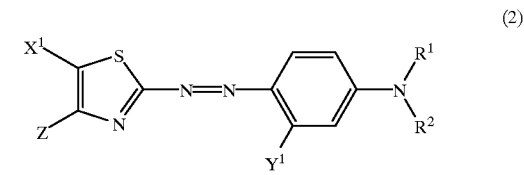

(2)

wherein $X^1$ is a substituent made of an electron attractive group which is conjugative with the diazo group of the formula (1) or (2) and has a para orientation, $Y^1$ is a hydroxyl group, a carboxyl group or $SO_3M$ (wherein M is a hydrogen atom or an alkaline metal), each of $R^1$ and $R^2$ is a $C_{1-6}$ linear or branched alkyl group, and Z is a hydrogen atom, a halogen atom or a $C_{1-3}$ alkyl group;

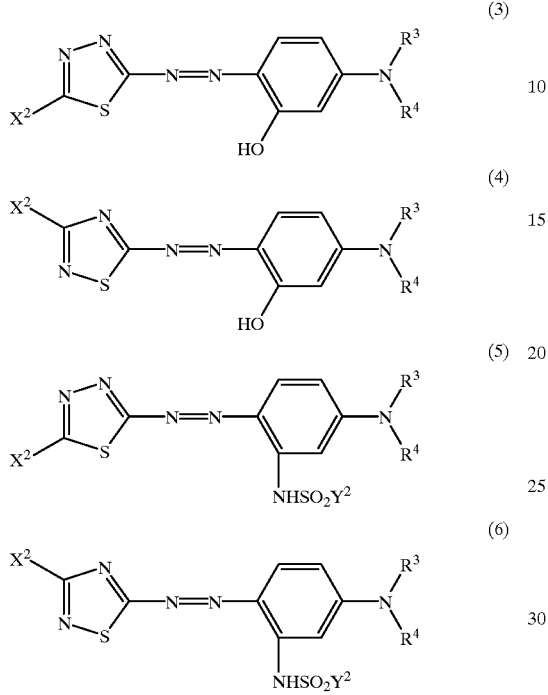

wherein $X^2$ is a hydrogen atom, a $C_{1-6}$ linear or branched alkyl group or a $C_{3-6}$ cycloalkyl group, $Y^2$ is a linear or branched alkyl group, and each of $R^3$ and $R^4$ is a $C_{1-6}$ linear or branched alkyl group.

The substituent having a para orientation will be explained below. When a 6-membered ring (a benzene ring) is substituted by an electron attractive group such as a diazo group, a substituent having the highest probability of substituting the 6-membered ring at the para-position (higher than each of the meta- and ortho-positions) to the electron attractive group, is referred to as a substituent having a para orientation. The substituent having the para orientation is, for example, a halogen atom. The probability can be determined to some extent by the calculation of an electron density in molecular orbit method.

In the compounds of the formulas (1) and (2), $X^1$ may, for example, be Br, Cl or $CF_3$, particularly preferably a halogen atom. Further, each of $y^2$, $R^3$ and $R^4$ may be a $C_{1-6}$ linear alkyl group or a $C_{3-6}$ branched alkyl group. Specifically, the following compounds may be mentioned:

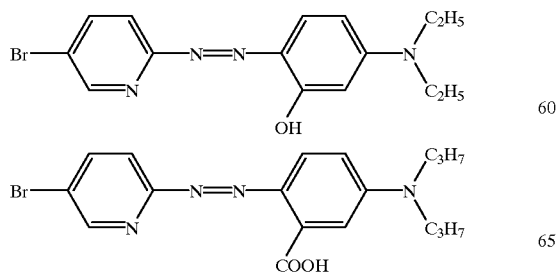

-continued

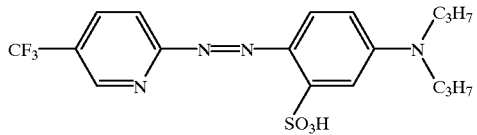

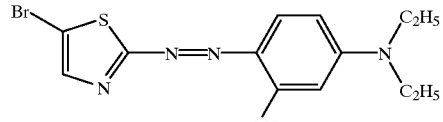

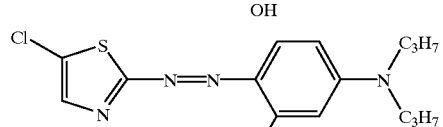

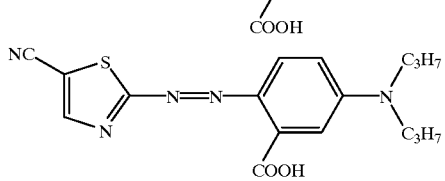

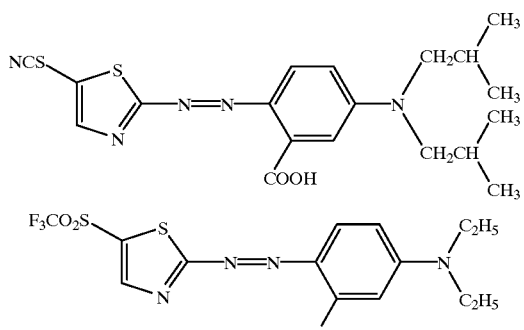

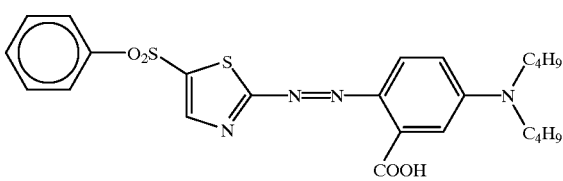

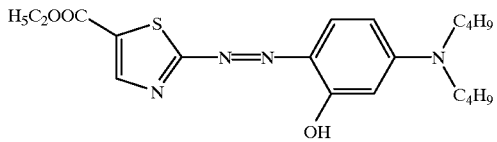

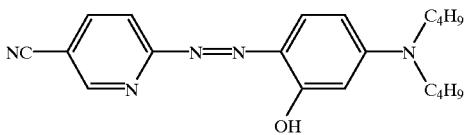

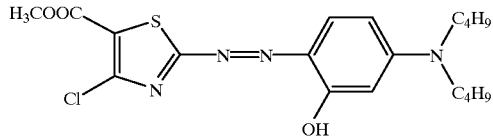

A wide range of dyes of this type are disclosed in e.g. Japanese Examined Patent Publication No. 67438/1993.

Among them, dyes for high density recording application are restricted to the above exemplified specific dyes.

The above compounds are believed to show excellent properties for high density recording, since when the temperature is higher than 100° C., the diazo bond will be unstable by substitution of an electron attractive group at a position conjugative with a diazo group, and consequently, the weight reduction during the decomposition becomes sharp.

In the formulas (3) to (6), $X^2$ may, for example, be a $C_{1-6}$ linear or branched alkyl group such as a methyl group, an ethyl group, a n-propyl group, an iso-propyl group, a n-butyl group, a tert-butyl group, a sec-butyl group, a n-pentyl group or a n-hexyl group; or a $C_{3-6}$ cycloalkyl group such as a cyclopropyl group, a cyclobutyl group, a cyclopentyl group or a cyclohexyl group, and each of $y^2$, $R^3$ and $R^4$ may, for example, be a $C_{1-6}$ linear or branched alkyl group. Specificly, the following compounds may, for example, be mentioned:

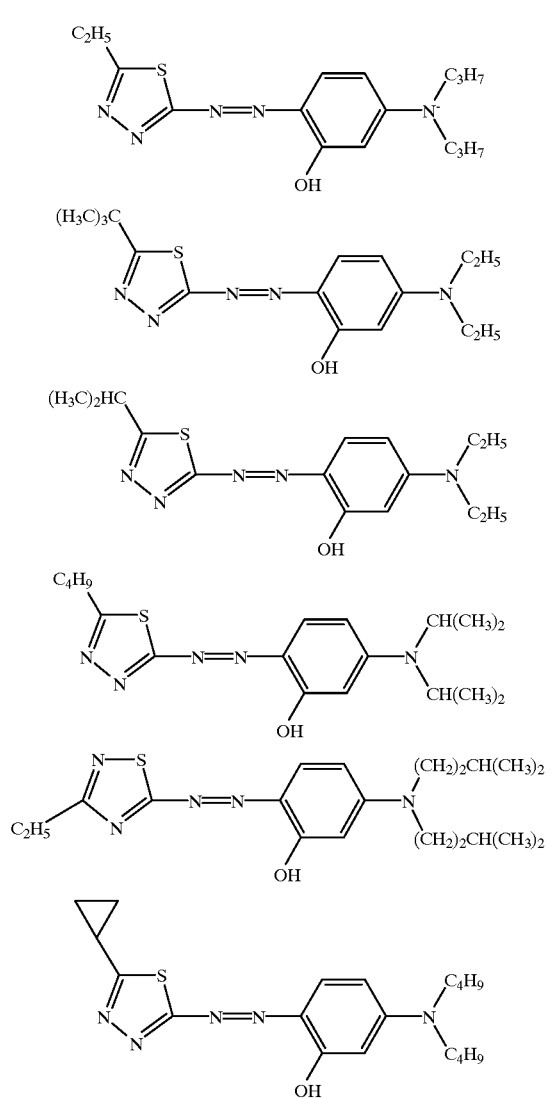

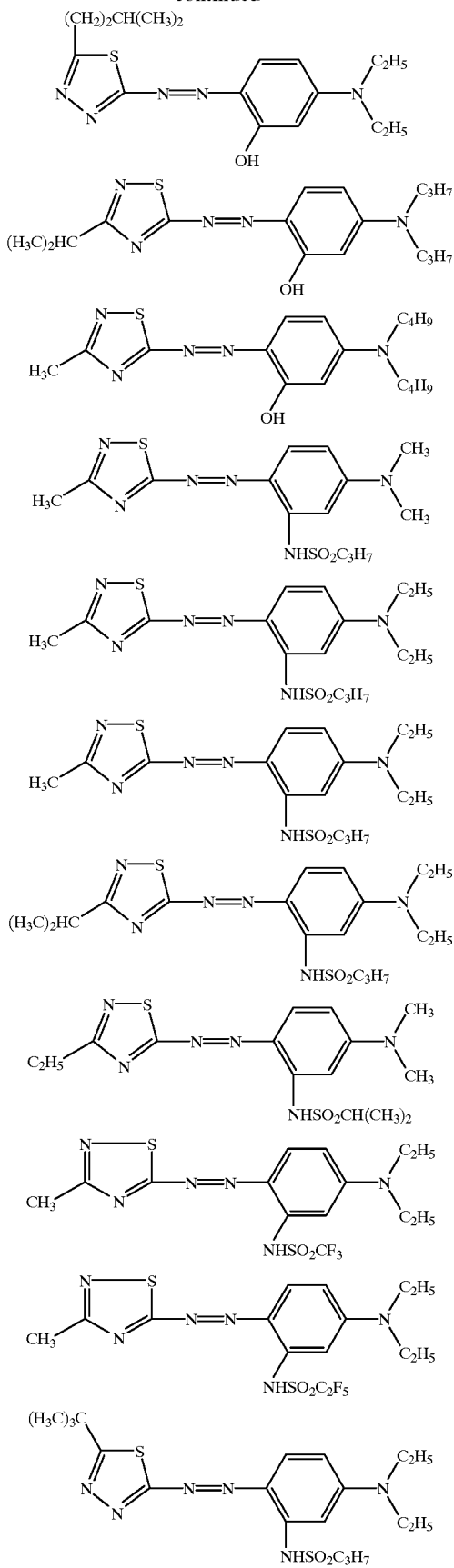

-continued

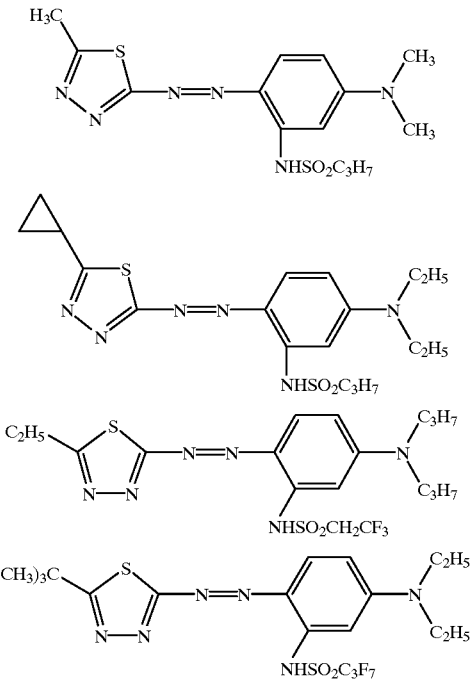

In the present invention, a metal chelate compound made of such a compound of the formula (1) to (6) and at least one metal selected from the group consisting of cobalt, nickel or copper, is employed. Here, as the metal, nickel is most preferred from the viewpoint of the stability of the metal chelate compound and the coating property.

As mentioned above, a suitable dye to be used for the recording layer of the present invention, is the one of which the inclination of the weight reduction to the temperature in the main weight reduction process, is at least 10%. Namely, in order to obtain adequate properties for short wavelength application, the weight reduction in the main weight reduction process in the thermogravimetric analysis must be sharp to the temperature. Because, by the reaction in the main weight reduction process, the organic dye film decomposes and undergoes a reduction in the film thickness and a change in the optical constant. As a result, bits (written marks) in an optical sense will be formed. Here, if the main weight reduction is slow against the temperature, i.e. if the weight reduction takes place over a wide temperature range, an optical change in the recording layer take place over a wide region in accordance with the temperature distribution of absorption layer. This is extremely disadvantageous for high density recording, since written marks' edge tend to overlap one another, thus leading to jitter or poor resolution of bits. Therefore, a dye which shows a sharp weight reduction to the temperature, is desired. For the same reason, it is disadvantageous to employ a dye of which the weight reduction process includes two steps. However, among organic dyes of various structures, those of which the inclination of the weight reduction is more than 10%/°C. are not many. Further, in order to obtain good recording properties such as adequate reflectivity, high modulation amplitude, there is an additional condition for optical properties to be satisfied. Accordingly, the number of dyes satisfying both of such requirements further decreases. In this connection, the present inventors have found it effective to use a dye (hereinafter referred to as a dye A) satisfying certain optical constants in combination with a material B which supplements deficiency in the thermal properties of the dye A. In this case, the dye A must satisfy such conditions that the molar absorbance coefficient $\epsilon$ of the dye A in a solution is at least 50,000, and the spectral absorption maximum or absorption shoulder closest to the recording/reproducing beam wavelength in the form of a film on the transparent substrate, which corresponds to the absorption on the longest wavelength side, is located on a wavelength side shorter by from 40 to 60 nm than the recording/reproducing beam wavelength. Further, preferred is a dye of which the refractive index n of the film is from 2 to 3 within ±5 nm of the recording/reproducing beam wavelength, and the extinction coefficient k is from 0.03 to 0.15. On the other hand, the material B to be mixed thereto is such that the spectral absorption maximum or absorption shoulder in the form of a film is on a wavelength side shorter by at least 60 nm than the recording/reproducing beam wavelength. If the material B satisfies such a condition, the optical effects of the dye A will not be hindered when a recording film is formed in combination with such a material B. Namely, it will be unnecessary to worry about a decrease in the reflectivity of the disc or about insufficiency of the amplitude of a recording signal. On the other hand, the material B is required to satisfy thermal properties such that the inclination of the above-mentioned weight reduction is at least 10%/°C., and the weight reduction is at least 55%, or the above weight reduction is at least 75%. The initiation temperature of the main weight reduction of the material B may be higher or lower than the dye A. However, it is preferably within ±100° C. of the initiation temperature of the main reduction of the dye A. If the initiation temperature departs from this range, it tends to be difficult to obtain the effects of the material B. Further, the material B is effective irrespective of whether the main weight reduction process is of a heat generation type or heat-absorption type. If the inclination of the weight reduction or the weight reduction (%) of the material B departs from the above range, the effects of the material B as the additive will not be obtained. Further, the thermal properties of the dye A are such that the inclination of the weight reduction to the temperature in the main weight reduction process is from 0.5 to 3%/°C., and the weight reduction in that process is from 40 to 55% of the total weight, or the inclination of the weight reduction is from 3%/°C. to 20%/°C., and the weight reduction is from 30 to less than 50% of the total weight. If the thermal properties of the dye A depart from these ranges, no adequate effects will be obtained even if an excellent material B is incorporated, and no adequate improvement of the recording properties can be obtained. As the dye A, it is preferred that the inclination of the above weight reduction is large, and the weight reduction (%) is large, since it is thereby possible to obtain excellent recording properties as a disc for the purpose of the present invention.

Further, the weight ratio of the material B to the dye A is preferably from 90:10 to 70:30.

Furthermore, the initiation temperature of the main weight reduction of the material B is preferably within a range of ±10° C. of the initiation temperature of the main weight reduction of the dye A.

Preferred as such a material B is a metal chelate compound made of an organic dye of the following formula (7) or (8) and at least one metal selected from the group consisting of cobalt, nickel and copper.

(7)

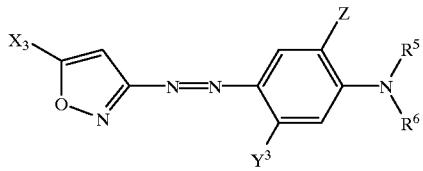

wherein $X^3$ is a $C_{1-7}$ alkyl group such as $CH_3$, $C(CH_3)_3$, $C_2H_5$, $C_3H_7$ or $C_4H_9$, a branched alkyl group, a cycloalkyl group, $SR^7_3$ or $OR^7_3$ (wherein $R^7$ is a $C_{1-7}$ alkyl group which may have a substituent, a branched alkyl group or a cycloalkyl group), $y^3$ is a hydroxyl group or $SO_3M$ (wherein M is a hydrogen atom or an alkaline metal), Z is a hydrogen atom, a halogen atom or an alkoxy group, and each of $R^5$ and $R^6$ is a $C_{1-6}$ alkyl group or a branched alkyl group;

(8)

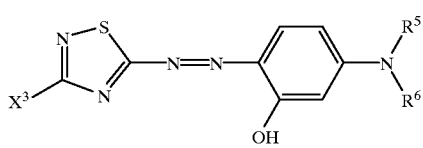

wherein $X^3$ is a $C_{1-7}$ alkyl group such as $CH_3$, $C(CH_3)_3$, $C_2H_5$, $C_3H_7$ or $C_4H_9$, a branched alkyl group or a cycloalkyl group, and each of $R^5$ and $R^6$ is a $C_{1-6}$ alkyl group or a branched alkyl group.

Specific examples include metal chelate compounds of the following compounds with Ni, Co and/or Cu.

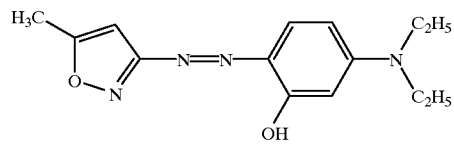

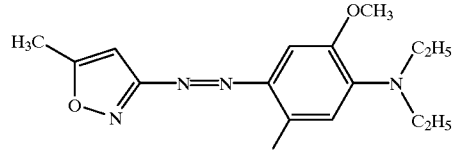

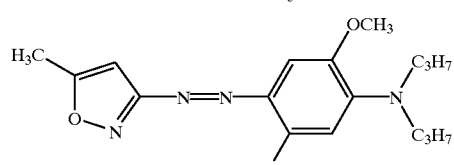

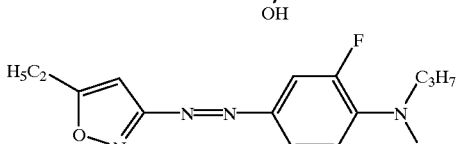

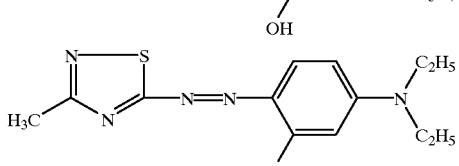

-continued

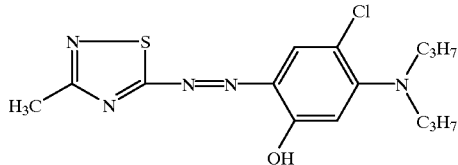

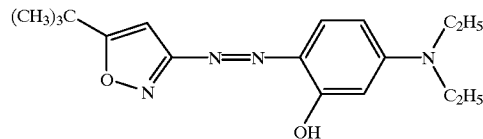

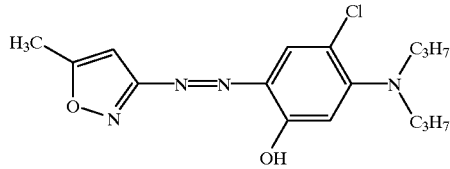

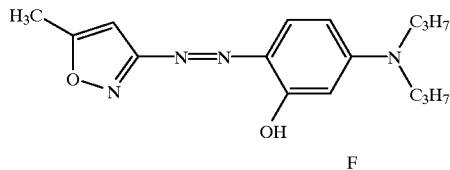

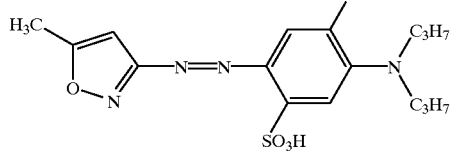

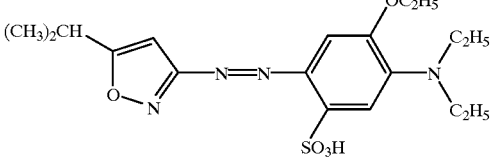

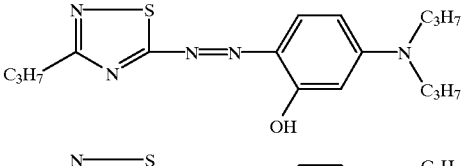

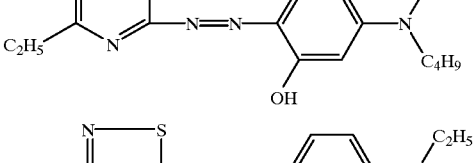

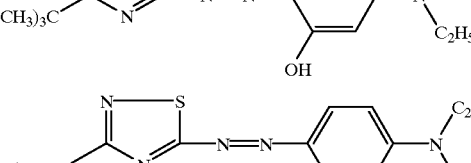

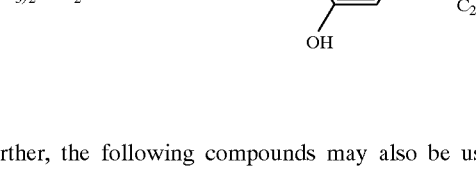

Further, the following compounds may also be useful, although they are outside the above general formulas.

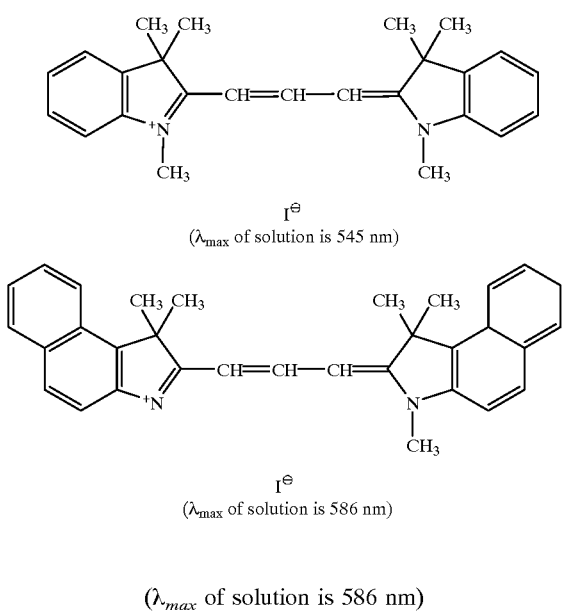

($\lambda_{max}$ of solution is 545 nm)

($\lambda_{max}$ of solution is 586 nm)

($\lambda_{max}$ of solution is 586 nm)

The recording layer of the optical recording medium of the present invention may further contain a binder as the case requires. The binder may be a conventional binder such as polyvinyl alcohol, polyvinyl pyrrolidone, a ketone resin, nitrocellulose, cellulose acetate, polyvinyl butyral or polycarbonate.

Further, to improve the stability or light resistance of the recording layer, a transition metal chelate compound such as acetyl acetonate chelate, bisphenyldithiol, salicylaldehyde oxime or bisdithio-α-diketone, may be incorporated as a singlet oxygen quencher. Further, other dyes may be used in combination, as the case requires. Such other dyes may be different kinds of analogous compounds, or dyes of different types such as triarylmethane dyes, azo dyes, cyanine dyes, squarilium dyes, metal-containing indoaniline dyes or phthalocyanine dyes.

The reflecting metal layer is a metal film which efficiently reflects a laser beam passed through the recording layer, and it is preferably the one having a refractive index n of from 0.1 to 0.2 and an extinction coefficient k of from 3 to 5 with a light in a wavelength range of ±5 nm of the recording/reproducing wavelength, so that the reflectivity within a range of from 600 to 700 nm will not decrease. A preferred reflecting metal film may, for example, be a reflecting metal film composed mainly of gold or a reflecting metal film composed mainly of silver. Particularly preferred is a reflecting metal film composed mainly of silver. Further, in order to improve the life stability, an additive element such as rhodium, palladium, platinum, titanium, molybdenum, zirconium, tantalum, tungsten or vanadium may be added to the silver within a range of not more than 5 atomic %. The film thickness of the reflecting metal layer is preferably at least 80 nm, and at a level not to suppress the deformation of the recording layer too much or not to deteriorate the recording sensitivity too much.

In the optical recording medium of the present invention, a protective layer is laminated on the reflective layer to prevent formation of holes in the reflecting metal layer at the record portion or to suppress asymmetric bit formation. As such a protective layer, an ultraviolet curable resin is preferred. The protecting layer usually has a film thickness of at least 1 μm, preferably at least 3 μm, so that suppression of curing by oxygen will not occur.

Further, optical recording media of the present invention may be used, so that the protective layers are bonded to each other.

Now, the present invention will be described in further detail with reference to Examples. However, it should be understood that the present invention is by no means restricted to such specific Examples.

COMPARATIVE EXAMPLE 1

On a polycarbonate substrate having a U-shape guide groove with a depth of 200 nm, a width of 0.45 μm (1.6 μm pitch) and an inclination angle of the groove wall of from 75° to 80°, a solution having 0.015 g of a metal-containing azo dye of the following formula (1):

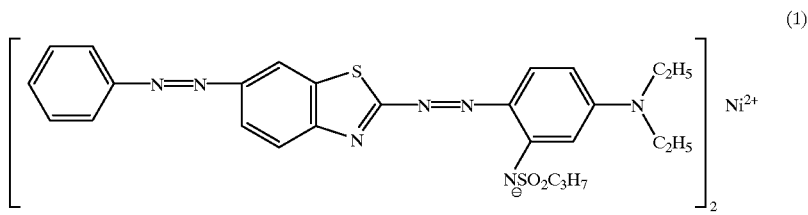

Figure 2:
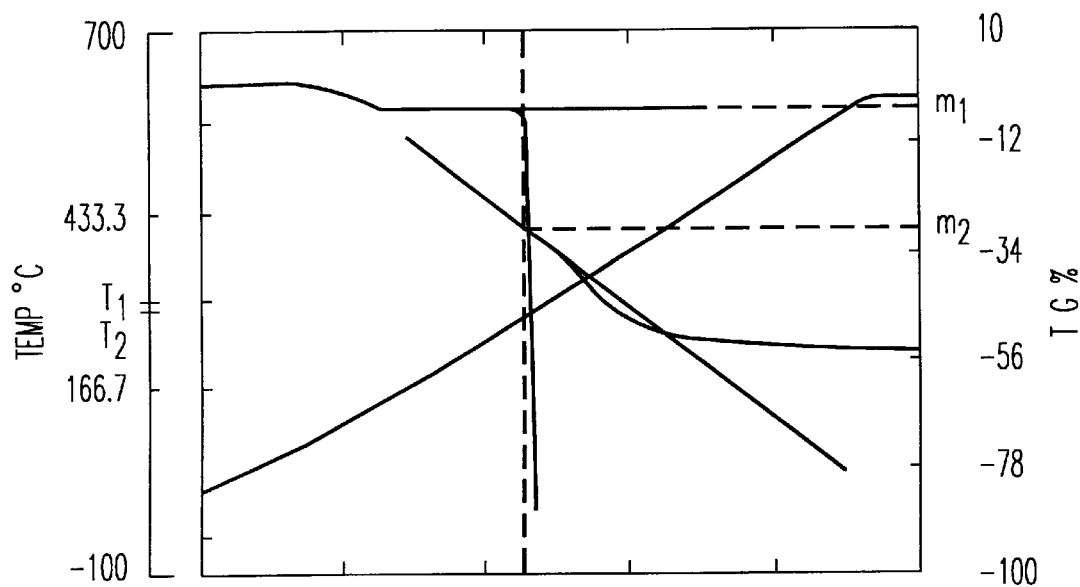
FIG. 2 is a differential thermobalance chart showing the weight reduction characteristic of the dye of for example, Comparative Example 1, material B2.

(1)

dissolved in 3 g of octafluoropentanol (OFP), was spin-coated at 800 rpm to form a recording layer having a film thickness of 120 nm (in groove). The depth of the groove of the coating film was 65% of the depth of the groove in the substrate. The weight reduction characteristics of this dye were as shown in FIG. 2. Namely, the total weight reduction in the main weight reduction process was 25.2%, the temperature difference was 8.9° C., and the inclination of the weight reduction was 2.8%/°C. The thermogravimetric analysis was carried out by means of a differential thermobalance ("SSC5200H" series "TG-DTA-320") manufactured by Seiko Denshi Kogyo K.K.

On this recording layer, gold was sputtered in a thickness of 60 nm, and an UV curable resin ("SD-318", manufactured by Dainippon Ink) was spin-coated in a thickness of about 3 μm thereon, followed by curing by an ultraviolet lamp to obtain a disc. This disc was subjected to recording in the groove at a linear velocity of 3 m/sec by a 680 nm semiconductor laser evaluator, whereby C/N was 55 dB, the modulation amplitude was 40%, and the reflectivity was 30% with a reproducing power of 0.6 mW at a recording frequency of 3 MHz at a duty ratio of 30% and with a recording power of 9 mW. The written mark was inspected by an optical microscope with a mercury lamp, whereby good short written marks with a length of 0.5 μm were observed, and no optical contrast reached the adjacent land portions. This recording layer had a refractive index n of 2.4 and an extinction coefficient k of 0.3 at 680 nm, and the absorption maximum as the film was 670 nm. The reflecting metal layer had a refractive index n of 0.13 and an extinction coefficient k of 3.89.

REFERENCE EXAMPLE 1

A disc was prepared in the same manner as in Comparative Example 1 except that a solution having 0.027 g of a metal-containing azo dye of the following formula (2):

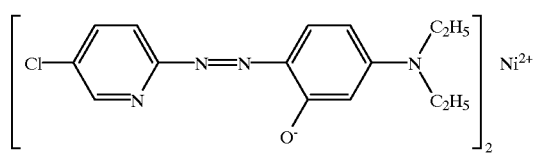

Figure 3:
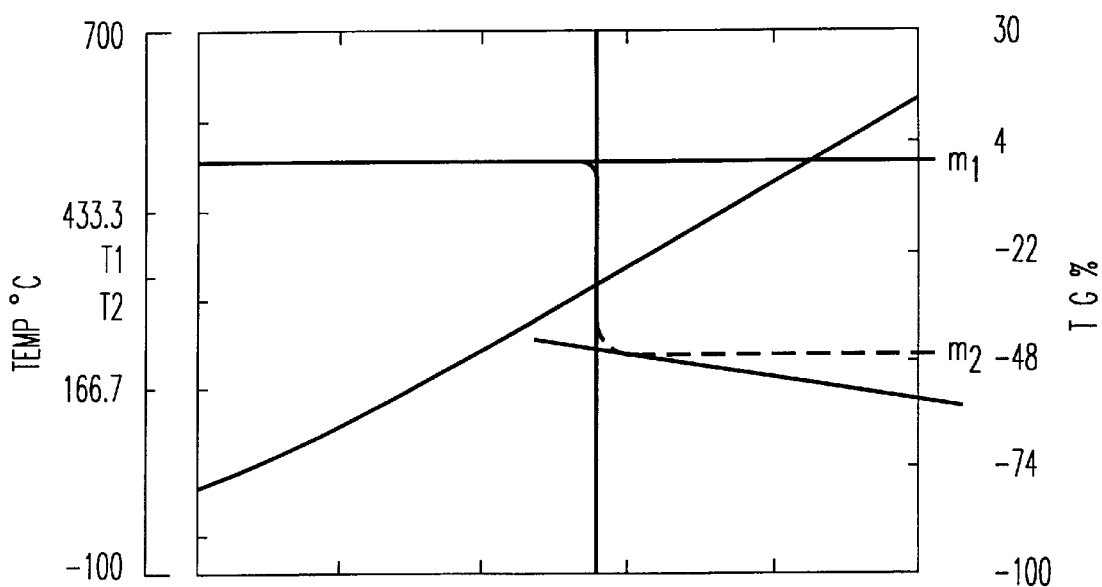
FIG. 3 is a differential thermobalance chart showing the weight reduction characteristic of the dye of Reference Example 1.

(2)

dissolved in 3 g of OFP was used. The film thickness at the groove of the recording layer was 100 nm, and the depth of the groove of the coated film was 70% of the depth of the groove in the substrate. The weight reduction characteristics of this dye were as shown in FIG. 3. Namely, the total weight reduction in the main weight reduction process was 45.5%, the temperature difference was 4.4° C., and the inclination of the weight reduction was 10.3%/°C. This disc was subjected to recording in the guide groove under the same recording conditions as in Comparative Example 1, whereby with a recording power of 10 mW, short pits with a pit length of 0.5 μm were formed, and excellent properties were obtained i.e. C/N was 55 dB, the modulation amplitude of EFM signal was 65%, and the reflectance was 50%. This dye layer had a refractive index n of 2.6 and an extinction coefficient k of 0.08 at 640 nm, and the absorption maximum as the film was 590 nm. The reflecting layer had a refractive index n of 0.14 and an extinction coefficient k of 3.59 at 640 nm.

REFERENCE EXAMPLE 2

Using a polycarbonate substrate having a U-shape guide groove with a depth of 160 nm, a width of 0.45 μm (1.6 μm pitch) and an inclination angle of the groove wall of from 75° to 80°, a disc was prepared in the same manner as in Comparative Example 1 except that a solution having 0.024 g of a metal-containing azo dye of the following formula (3):

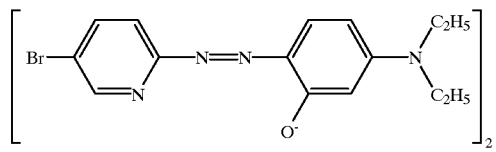

Figure 4:
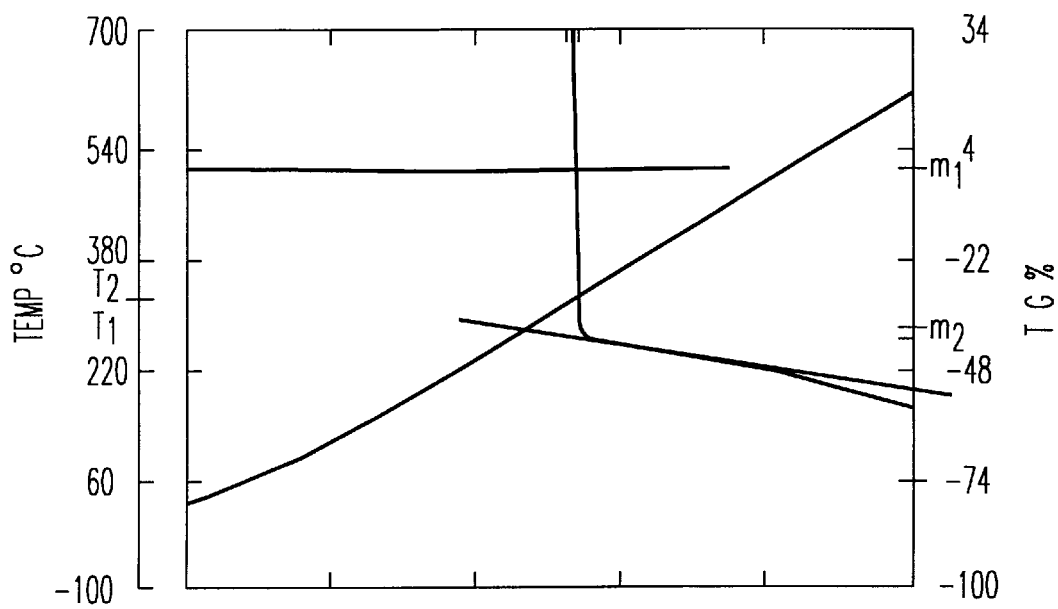
FIG. 4 is a differential thermobalance chart showing the weight reduction characteristic of the dye of Reference Example 2.

(3)

dissolved in 3 g of OFP was used. The film thickness at the groove of the recording layer was 100 nm, and the depth of the groove of the coating film was 65% of the depth of the groove in the substrate. The weight reduction characteristics of this dye were as shown in FIG. 4. Namely, the total weight reduction in the main weight reduction process was 40.9%, the temperature difference was 3.8° C., and the inclination of the weight reduction was 10.8%/°C. This disc was subjected to recording under the same conditions as in Comparative Example 1, whereby excellent properties were obtained i.e. C/N was 58 dB, the modulation amplitude of EFM signal was 67%, and the reflectance was 60%. This dye layer had a refractive index n of 2.5 and an extinction coefficient k of 0.07 at 640 nm, and the absorption maximum as the film was 585 nm. The written mark had good short pits having a small width.

REFERENCE EXAMPLE 3

A disc was prepared in the same manner as in Comparative Example 1 except that the reflective layer was changed to silver. Recording was carried out under the same conditions as in Comparative Example 1, whereby good properties were obtained i.e. with 8.5 mW, C/N was 58 dB, and the modulation amplitude was 44%. The single layer of this silver layer had a refractive index n of 0.14 and an extinction coefficient k of 4.44 at 680 nm.

COMPARATIVE EXAMPLE 2

A disk was prepared in the same manner as in Comparative Example 1 except that a solution having 0.03 g of a metal-containing azo dye of the following formula (4):

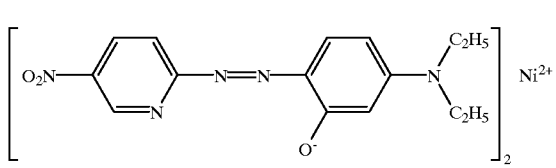

Figure 5:
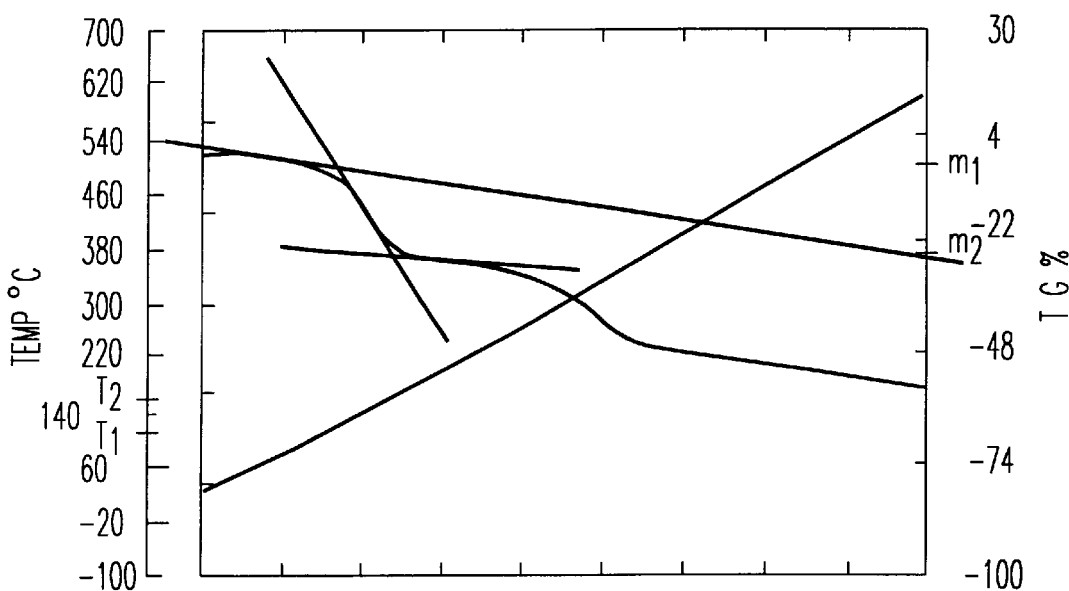
FIG. 5 is a differential thermobalance chart showing the weight reduction characteristic of the dye of Comparative Example 2.

(4)

dissolved in 3 g of OFP was used. The weight reduction characteristics of this dye were as shown in FIG. 5. Namely, the total weight reduction in the main weight reduction process was 20.8%, the temperature difference was 44.4° C., and the inclination of the weight reduction was 0.47%/°C. This disc was subjected to recording under the same conditions as in Comparative Example 1 and inspected by an optical microscope, whereby it was found that the written mark length was 0.6 μm, the pit width was 0.7 μm, and the optical change reached the adjacent land portions.

COMPARATIVE EXAMPLE 3

A disk was prepared in the same manner as in Comparative Example 1 except that the dye in Comparative Example 1 was changed to 0.03 g of a metal-containing azo dye of the following formula (5):

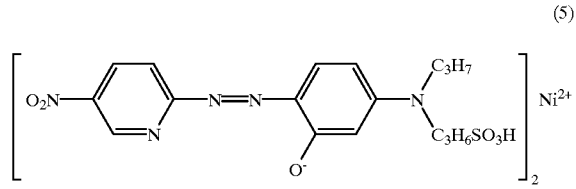

(5)

Figure 6:
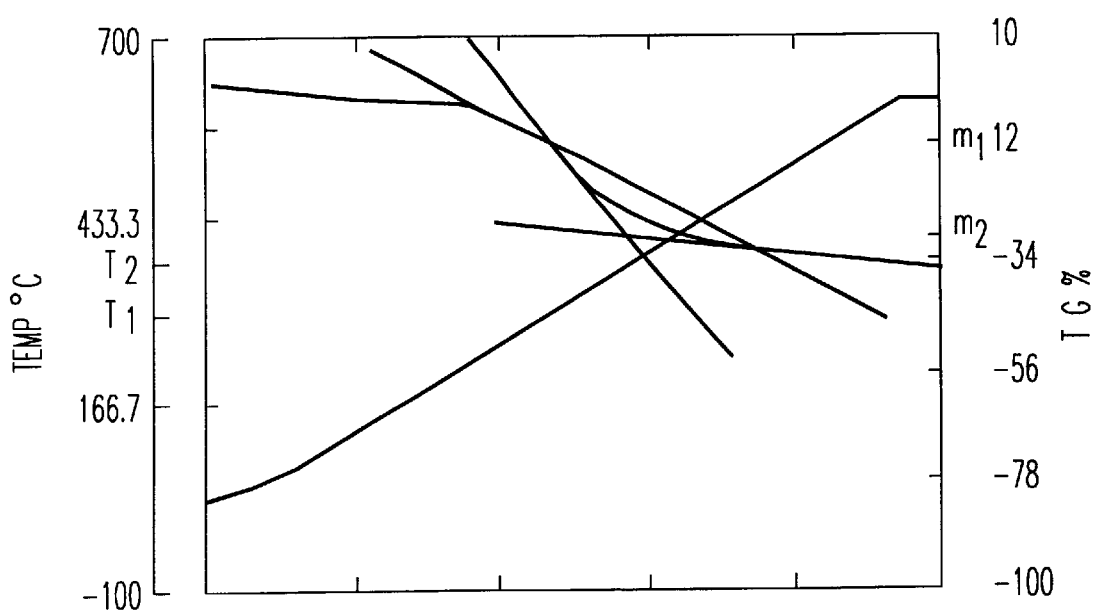
FIG. 6 is a differential thermobalance chart showing the weight reduction characteristic of the dye of Comparative Example 3.

The weight reduction characteristics of this dye were as shown in FIG. 6. Namely, the total weight reduction in the main weight reduction process was 18.3%, the temperature difference was 71.1° C., and the inclination of the weight reduction was 0.26%/°C. With respect to this disc, the recording properties against the record pit length were examined by changing the recording frequency to 3 MHz, 2.4 MHz and 1.2 MHz at 680 nm, 3 m/s and a duty of 30%, whereby the length and the width of the record pits sharply increased as the recording power increased, and control was difficult, and it was impossible to form a good record portion.

EXAMPLE 1

On a polycarbonate substrate having a U-shape guide groove with a depth of 180 nm, a width (a half value width of the groove) of 0.37 μm (0.9 μm pitch) and an inclination angle of the groove wall of 80°, a solution having 0.036 g of a metal-containing azo dye of the following formula (6):

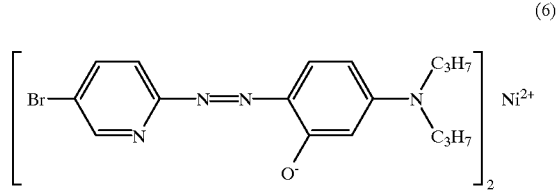

(6)

dissolved in 3 g of octafluoropentanol (OFP (boiling point: 140° C.)), was spin-coated at 800 rpm and subjected to anneal treatment for 45 minutes in an oven of 80° C. to form a recording layer. The recording layer (a single dye layer) had a refractive index n of 2.45 and an extinction coefficient k of 0.05 at 640 nm. The weight reduction characteristics of this dye were such that the total weight reduction in the main weight reduction process was 39.8% (initiation temperature of the main reduction: 317° C.), the temperature difference was 2.5° C., and the inclination of the weight reduction was 15.9%/°C. The thermogravimetric analysis was carried out by means of a differential thermobalance ("SSC5200H" series "TGDTA-320") manufactured by Seiko Denshi Kogyo K.K.

On this recording layer, silver was sputtered in a thickness of 100 nm, and an ultraviolet curable resin ("EX-318", manufactured by Dainippon Ink) was spin-coated thereon in a thickness of about 3 μm, followed by curing by an ultraviolet lamp to obtain a disc. On this disc, recording was carried out in the groove at a linear velocity of 3 m/sec by a semiconductor laser evaluator (NA=0.6) of 640 nm or 680 nm, whereby with a reproducing power of 0.7 mW, the recording frequency was changed from 1.5 MHz to 3.8 MHz at a duty ratio of 30%, and recording was carried out with a recording power of such a level that mark jitter becomes minimum at the time of recording at a frequency of 3.8 MHz, whereby the minimum pit length where the mark jitter is less than 10 ns was determined to evaluate the possibility of high density recording of the recording film (hereinafter referred to as the jitter property). In the case of this dye, the jitter property was 0.4 μm with the recording power of 9 mW. Further, with this recording power, quadruple speed FEM signal (n−1)T of CD-R was input, whereby a good short pit property with a jitter being not higher than 30% of T was obtained even at 4.8 m/s, 3.8 m/s, 3 m/s (hereinafter referred to as EFM signal property) or 2.8 m/s. The modulation amplitude of EFM signal was at least 55%. Further, the film thickness at the groove of the record portion was 120 nm, and the groove of the coating film was a U-shape with a depth of 140 nm as measured by STM. The absorption maximum as a film of this recording layer was 600 nm. The reflectance of the record portion of this disc was sufficiently high at 60% with 0.7 mW. Therefore, reproduction was continuously carried out 1,000,000 times with 0.7 mW, whereby no deterioration was observed. Evaluation was carried out in the same manner as above except that the concentration of this dye was changed to 1 wt % (relative to the weight of the solvent), and the results are shown in the column for Example 1 in Table 1. In this case, the film thickness at the groove was about 100 nm, and the depth of the groove of the coating film was 147 nm. Further, a single layer of this recording layer was subjected to a test of exposure for 40 hours by a xenon fade meter, whereby this dye showed good light resistance with absorbance of 90%, while a cyanine dye underwent color fading so that the absorbance at the absorption maximum became 0%.

EXAMPLES 2 TO 6 AND COMPARATIVE EXAMPLES 4 TO 7

By changing the structure of the dye as shown in Table 1, discs were prepared in the same manner as in Example 1 and subjected to the same test. The results are shown in Table 1. The film thickness at the groove and the depth of the groove of the coating film of each disc were at a level of ±10 to 20 nm of the respective values in Example 1. In each of Examples 2 to 6, the modulation amplitude of EFM signal was at least 55%.

TABLE 1

| | Structure of the dye used | | | | Absorption maximum or absorption shoulder of the film closest to the recording/reproducing wavelength | Decomposition temp | Total weight reduction | Inclination of the weight reduction | Jitter property | EFM resolution | Recording wavelength |
|---|---|---|---|---|---|---|---|---|---|---|---|
| | Formula | $X^1$ | $Y^1$ | $R^1, R^2$ | (nm) | (° C.) | reduction | (%/° C.) | (μm) | | (μm) |
| Example 2 | 1 | Br | $O^-$ | $C_3H_7$ | 590 | 317 | 39.8 | 15.9 | 0.40 | ○ | 640 |
| Example 3 | 1 | Cl | O | $C_3H_7$ | 580 | 329 | 45.9 | 14.6 | 0.40 | ○ | 640 |
| Example 4 | 1 | $CF_3$ | $O^-$ | $C_2H_5$ | 600 | 315 | 45.4 | 9.7 | 0.40 | ○ | 640 |
| Example 5 | 2 | Br | $O^-$ | $C_2H_5$ | 620 | 240 | 34.0 | 4.2 | 0.45 | ○ | 680 |
| Example 6 | 2 | Br | $SO_3^-$ | $C_2H_5$ | 670 | 263 | 27.0 | 5.0 | 0.45 | ○ | 680 |
| Comparative Example 4 | * | Br | $O^-$ | $C_2H_5$ | 600 | 280 | 47.0 | 6.4 | ** | ** | 640 |
| Comparative Example 5 | 1 | $NO_2$ | $O^-$ | $CH_3$ | 610 | 317 | 11.2 | 0.3 | *** | x | 680 |

TABLE 1-continued

| | Structure of the dye used | | | | Absorption maximum or absorption shoulder of the film closest to the recording/ reproducing wavelength | Decomposition temp | Total weight reduction | Inclination of the weight reduction | Jitter property | EFM resolution | Recording wavelength |
|---|---|---|---|---|---|---|---|---|---|---|---|
| | Formula | $X^1$ | $Y^1$ | $R^1, R^2$ | (nm) | (° C.) | reduction | (%/° C.) | (μm) | | (μm) |
| Comparative Example 6 | 2 | Nil | O⁻ | CH₃ | 610 | 292 | 40.8 | 0.6 | 0.47 | x | 680 |
| Comparative Example 7 | 2 | Nil | SO₃⁻ | C₂H₅ | 650 | 277 | 32.6 | 1.4 | 0.47 | x | 680 |

As the metal for the metal chelate compounds, nickel was employed. In each case, $R^1$ and $R^2$ were the same.

The decomposition temperature represents the initiation temperature in the main weight reduction process as measured by a differential thermobalance.

The jitter property represents a pit length where the mark jitter became not higher than 10 ns.

For the determination of the EFM resolution, recording was carried out by inputting quadruple speed EFM signal (n−1)T of CD-R and changing the linear velocity to 4.8 m/s, 3.8 m/s and 3.0 m/s. Symbol X represents a case where the jitter is at least 30% of T at 3.0 m/s. Symbol * represents a compound of the following formula (7):

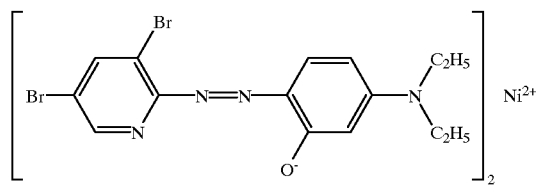

Symbol  indicates that the absorbance of the single film was too low to measure it. Symbol * indicates that the jitter was at least 20 ns at any pit length.

EXAMPLE 7

A disc was prepared in the same manner as in Example 1, except that the solvent for the dye was changed to tetrafluoropropanol (boiling point: 110° C.). The dye concentration was 1 wt % relative to the weight of the solvent, whereby the film thickness at the groove was 125 nm, and the depth of the groove of the coating film was 145 nm.

The jitter property of this disc was 0.4 μm, and the EFM resolution was the same as in Example 1. Further, the modulation amplitude of EFM signal was at least 55%.

COMPARATIVE EXAMPLE 8

A recording layer was formed in the same manner as in Example 1 except that the solvent was changed to diacetone alcohol (boiling point: 166° C.), whereby the absorbance at the absorption maximum of this film was about 40% of the absorbance in Example 1, and no adequate degree of recording modulation was obtained.

In the following, ε (molar absorbance coefficient) is calculated on an assumption that two mols of an azo compound are coordinated to one atom of a metal.

EXAMPLE 8

(a) Preparation

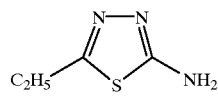

2.58 g of 2-amino-5-ethyl-1,3,4-thiazole of the above formula (1) was dissolved in 20 ml of acetic acid and 10 ml of propionic acid, then 2 ml of sulfuric acid was dropwise added at a temperature of from 0° to 5° C., and 7.09 g of 43% nitrosylsulfuric acid was added at a temperature of from 0° to 5° C. for diazotization. The obtained diazotized solution was dropwise added at a temperature of from 0° to 5° C. to a solution having 5.32 g of N,N-dibutyl-3-aminophenol, 0.8 g of urea and 8.0 g of sodium acetate dissolved in 100 ml of methanol, followed by stirring for 2 hours, and then the mixture was left to stand overnight. Precipitated crystals were collected by filtration and dried to obtain 2.19 g of red crystals of the following formula (2):

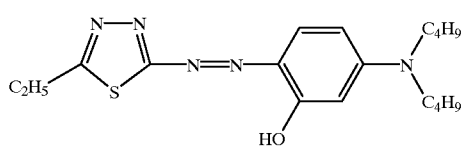

2.19 g of the azo compound of the formula (2) thus obtained was dissolved in 50 ml of methanol, and a solution having 1.13 g of nickel acetate tetrahydrate dissolved in 15 ml of methanol, was added at room temperature. Then, the mixture was stirred at room temperature for 3 hours, and 50 ml of water was added thereto. Precipitated crystals were collected by filtration and dried to obtain 1.13 g of a nickel chelate compound as greenish brown crystals. This compound had $\lambda_{max}$ (in chloroform) of 525 nm (ε=8.5×10⁴). The total weight reduction in the main weight reduction process of the dye was 35.5% (initiation temperature of the main reduction: 276° C.), the temperature difference was 10.7° C., and the inclination of the weight reduction was 3.3%/°C.

(b) Recording medium

The nickel chelate compound obtained as described above, was dissolved in octafluoropentanol to obtain a solution having a concentration of 1.2 wt %. This solution was subjected to supersonic dispersion at 50° C. for 30 minutes and then to filtration with a filter of 0.2 μm. The solution thus obtained was spin-coated on a polycarbonate substrate having a thickness of 0.6 mm at a rotational speed of 800 rpm. The substrate had a U-shape groove with a depth of 140 nm, a width of 0.30 μm (track pitch: 0.70 μm) and an inclination angle of the groove wall of 70°. The depth of the groove of the coating film was 90 nm, which was 64% of the depth of the groove in the substrate. Then, this coating film was dried in an oven of 80° C. Then, on this coating film, a gold film having a thickness of 100 nm was formed by sputtering to form a reflective layer. Further, on this reflecting layer, an ultraviolet curable resin was spin-coated in a thickness of about 3 μm and cured by irradiating ultraviolet rays, to obtain a recording medium. The absorption maximum (absorption shoulder) of the coating film on the longest wavelength side was 586 nm. The film thickness of the recording layer was about 130 nm in the groove portion. Further, recording media obtained in the same manner were bonded to each other with a hot melt adhesive Macomelt manufactured by Toa Gosei, to obtain an optical disc.

(c) Optical recording

On the optical disc obtained as described above, a EFM signal corresponding to quadruple speed of CD-R was recorded by a semiconductor laser (manufactured by Pulstic) of 640 nm (NA=0.6) at a linear velocity of 2.5 m/s with a reproducing power of 0.7 mW and a recording power of 6.5 mW, whereby good recording properties were obtained i.e. $I_{top}$ reflectance was 56%, the modulation amplitude of EFM signal=$I_{11}/I_{top}$=58%, and 3T mark jitter was 15 ns.

EXAMPLE 9

(a) Preparation

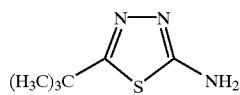
(3)

3.14 g of 2-amino-5-tert-butyl-1,3,4-thiadiazole of the above formula (3) was dissolved in 20 ml of acetic acid and 10 ml of propionic acid, then 2 ml of sulfuric acid was dropwise added thereto at a temperature of from 0° to 5° C., and 7.09 g of 43% nitrosylsulfuric acid was added thereto at a temperature of from 0° to 5° C. for diazotization. The obtained diazotized solution was dropwise added at a temperature of from 0° to 5° C. to a solution having 3.96 g of N,N-diethyl-3-aminophenol, 0.8 g of urea and 8.0 g of sodium sulfate dissolved in 100 ml of methanol, followed by stirring for 3 hours, and then the mixture was left to stand overnight. Precipitated crystals were collected by filtration and dried to obtain 2.78 g of red crystals of the following formula (4):

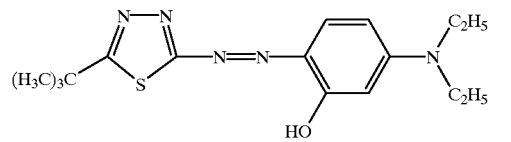
(4)

2.66 g of the azo compound of the formula (4) obtained as described above, was dissolved in 100 ml of methanol and 20 ml of THF, and a solution having 2.38 g of nickel acetate tetrahydrate dissolved in 80 ml of methanol, was added thereto at room temperature. Then, the mixture was stirred at room temperature for 3 hours, and 100 ml of water was added thereto. Precipitated crystals were collected by filtration and dried to obtain 0.94 g of a nickel chelate compound as greenish brown crystals. This compound had $\lambda_{max}$ (in chloroform) of 515 nm ($\epsilon$=6.4×10⁴). The total weight reduction in the main weight reduction process of the dye was 47% (initiation temperature of the main reduction: 313° C.), the temperature difference was 7° C., and the inclination of the weight reduction was 6.6%° C.

(b) Recording medium

Using the nickel chelate compound obtained as described above, a recording medium was prepared in the same manner as in Example 8. The absorption maximum (absorption shoulder) of the coating film on the longest wavelength side was 574 nm. The film thickness of the recording layer was substantially the same as in Example 8.

(c) Optical recording

On the optical disc obtained as described above, recording was carried out under the same conditions as in Example 8, whereby good recording properties were obtained, i.e. with a recording power of 6.8 mW, $I_{top}$ reflectance was 54%, $I_{11}/I_{top}$=60%, and 3T mark jitter was 15 ns.

EXAMPLE 10

(a) Preparation 9.10 g of thiosemicarbazide and 8.81 g of isobutyric acid were dissolved in 120 ml of ethylene glycol dimethyl ether, and 15.4 g of phosphorus oxochloride was dropwise added thereto over a period of one hour. The mixture was gradually heated and then refluxed for 2 hours. The mixture was left to stand overnight, whereupon precipitated crystals were collected by filtration. The crystals were dissolved in 100 ml of ice water, and the pH was adjusted to 9 with a 25% sodium hydroxide aqueous solution. Precipitated crystals were collected by filtration and dried to obtain 9.01 g of colorless crystals of the following formula (5):

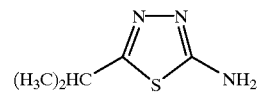
(5)

1.43 g of 2-amino-5-isopropyl-1,3,4-thiadiazole of the above formula (5) was dissolved in 10 ml of acetic acid and 5 ml of propionic acid, then 1 ml of sulfuric acid was added thereto at a temperature of from 0° to 5° C., and 3.55 g of 43% nitrosylsulfuric acid was added thereto at a temperature of from 0° to 5° C. for diazotization. The obtained diazotized solution was dropwise added at a temperature of from 0° to 5° C. to a solution having 1.98 g of N,N-diethyl-3-aminophenol, 0.4 g of urea and 4.0 g of sodium acetate dissolved in 30 ml of methanol, followed by stirring for 5 hours. Then, the mixture was left to stand overnight. Precipitated crystals were collected by filtration and dried to obtain 0.83 g of red crystals of the following formula (6):

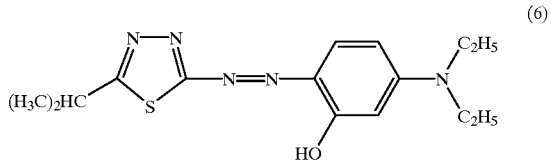

(6)

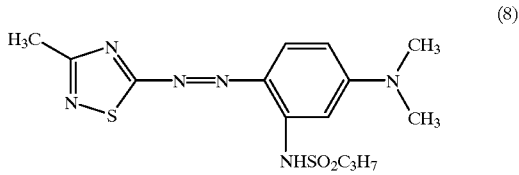

(8)

0.70 g of the azo compound of the formula (6) obtained as described above and 0.18 g of anhydrous sodium sulfate were dissolved in 26 ml of THF and 13 ml of water, and a solution having 0.33 g of nickel acetate tetrahydrate dissolved in 10 ml of methanol, was added thereto at room temperature. Then, the mixture was stirred at room temperature for 2 hours, and 23 ml of water was added thereto. Precipitated crystals were collected by filtration and dried to obtain 0.38 g of a nickel chelate compound as dark green crystals. This compound had $\lambda_{max}$ (in chloroform) of 520 nm ($\epsilon=7.9\times10^4$). The total weight reduction in the main weight reduction process of the dye was 39.5% (initiation temperature of the main reduction: 275° C.), the temperature difference was 8.9° C., and the inclination of the weight reduction was 4.4%/°C.

(b) Recording medium

Using the nickel chelate compound obtained as described above, a recording medium was prepared in the same manner as in Example 8. The absorption maximum (absorption shoulder) of the coating film on the longest wavelength side was 584 nm. The film thickness of the recording layer was about 120 nm in the groove portion.

(c) Optical recording

On the optical disc thus obtained, recording was carried out under the same conditions as in Example 8, whereby good recording properties were obtained, i.e. with a recording power of 6.4 mW, $I_{top}$ reflectance was 62%, $I_{11}/I_{top}=$ 64%, and 3T mark jitter was 15 ns.

EXAMPLE 11

(a) Preparation

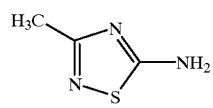

(7)

1.15 g of 5-amino-3-methyl-1,2,4-thiadiazole of the formula (7) was dissolved in 10 ml of acetic acid and 5 ml of propionic acid, then 1 ml of sulfuric acid was dropwise added thereto at a temperature of from 0° to 5° C., and 3.55 g of 43% nitrosylsulfuric acid was added thereto at a temperature of from 0° to 5° C. for diazotization. The obtained diazotized solution was dropwise added at a temperature of from 0° to 5° C. to a solution having 2.90 g of N,N-diethyl-3-aminophenol, 0.4 g of urea and 4.0 g of sodium acetate dissolved in 30 ml of methanol, followed by stirring for 3 hours. Then, the mixture was left to stand overnight. Precipitated crystals were collected by filtration and dried to obtain 1.24 g of red crystals of the following formula (8):

1.11 g of the azo compound of the formula (8) obtained as described above, was dissolved in 50 ml of methanol, and a solution having 0.90 g of nickel acetate tetrahydrate dissolved in 12 ml of methanol, was added thereto at room temperature. Then, the mixture was stirred at room temperature for 3 hours, and 15 ml of water was added thereto. Precipitated crystals were collected by filtration and dried to obtain 0.31 g of a nickel chelate compound as green crystals. This compound had $\lambda_{max}$ (in chloroform) of 546 nm ($\epsilon=8.7\times10^4$). The total weight reduction in the main weight reduction process of the dye was 48% (initiation temperature of the main reduction: 280° C.), the temperature difference was 6° C., and the inclination of the weight reduction was 8%/°C.

(b) Recording medium

Using the nickel chelate compound obtained as described above, a recording medium was prepared in the same manner as in Example 8. The absorption maximum (absorption shoulder) of the coating film on the longest wavelength side was 587 nm. The film thickness of the recording layer was about 120 nm. The reflective layer was a silver having a thickness of 110 nm. Further, n and k of silver at 640 nm were 0.14 and 4.15, respectively.

(c) Optical recording

On the optical disc thus obtained, recording was carried out under the same conditions as in Example 8, whereby good recording properties were obtained, i.e. with a recording power of 6.2 mW, $I_{top}$ reflectance was 56%, $I_{11}/I_{top}=$ 62%, and 3T mark jitter was 15 ns.

EXAMPLES 12 TO 15

Examples 12 to 15 were carried out in the same manner as in Examples 8 to 11. The following Table shows $\lambda_{max}$ (in chloroform) of a solution of the nickel chelate compound in each of Examples 8 to 15, and the absorption maximum or absorption shoulder of the coating film on the longest wavelength side.

Figure 7:
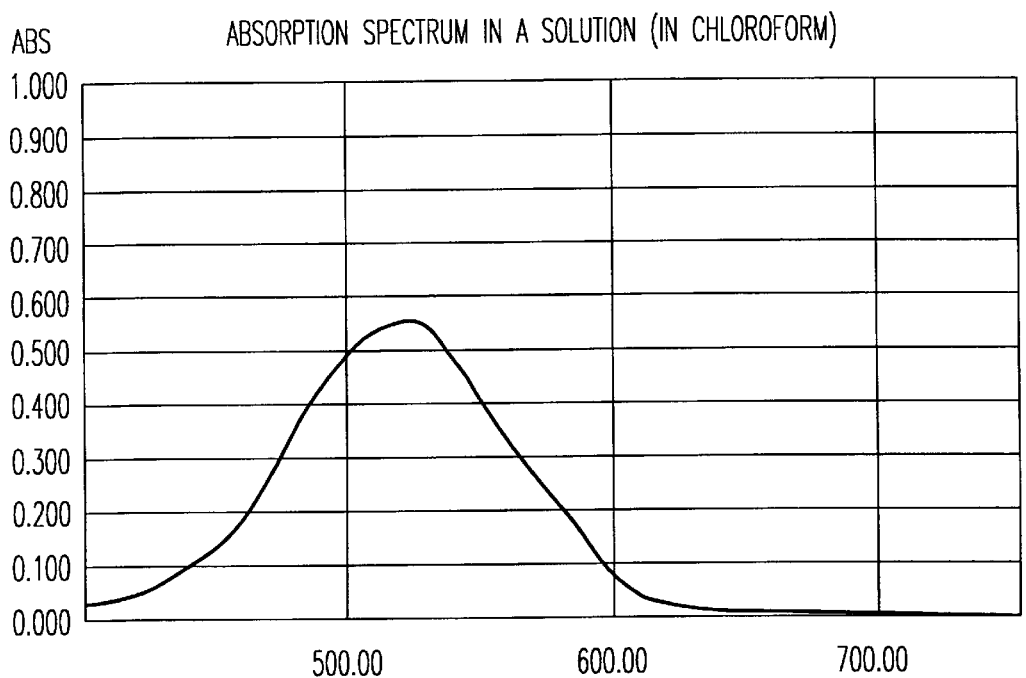
FIG. 7 is the visible light absorption spectrum of the dye of Example 10 in a solution.
Figure 8:
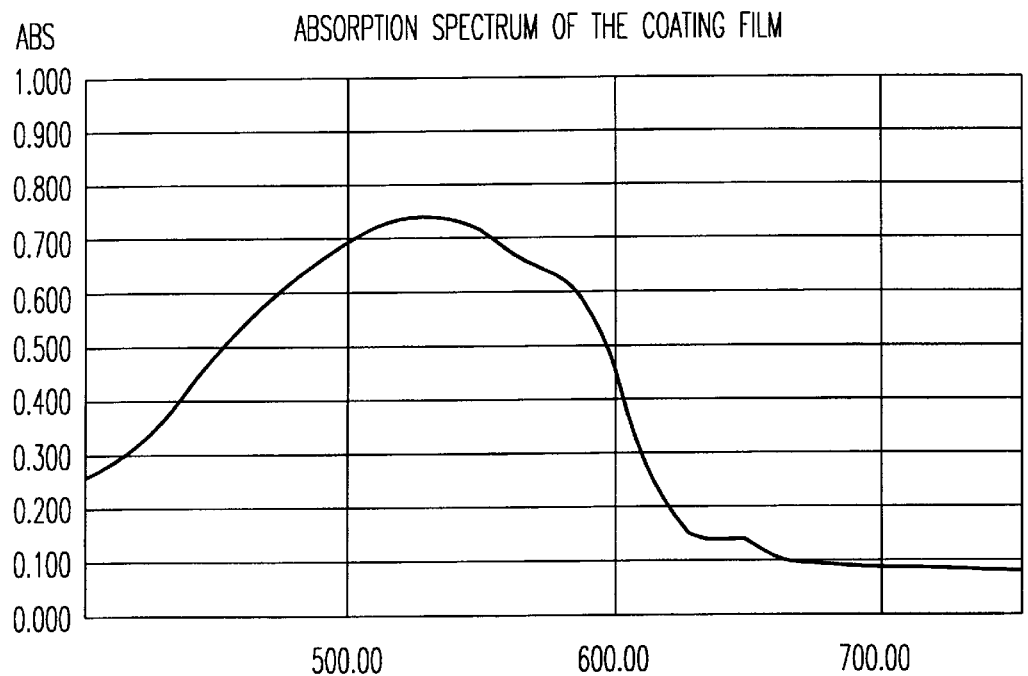
FIG. 8 is the visible light absorption spectrum of the dye of Example 10 in a coating film.

With respect to Example 10, the absorption spectrum in chloroform and the absorption spectrum of the coating film are shown in FIGS. 7 and 8, respectively.

| Example | Metal chelate compound | λ$_{max}$ (nm) of the solution | Absorption maximum or absorption shoulder of the coating film on the longest wavelength side (nm) |
|---|---|---|---|
| 8 | {structure with C$_2$H$_5$, C$_4$H$_9$, C$_4$H$_9$}$_2$ Ni$^{2+}$ | 525 | 586 |
| 9 | {structure with (H$_3$C)$_3$C, C$_2$H$_5$, C$_2$H$_5$}$_2$ Ni$^{2+}$ | 515 | 574 |
| 10 | {structure with (H$_3$C)$_3$HC, C$_2$H$_5$, C$_2$H$_5$}$_2$ Ni$^{2+}$ | 520 | 584 |
| 11 | {structure with H$_3$C, CH$_3$, CH$_3$, N-SO$_2$C$_3$H$_7$}$_2$ Ni$^{2+}$ | 546 | 587 |
| 12 | {structure with H$_3$C, C$_2$H$_5$, C$_2$H$_5$, N-SO$_2$CH$_3$}$_2$ Ni$^{2+}$ | 549 | 589 |
| 13 | {structure with H$_3$C, C$_2$H$_5$, C$_2$H$_5$, N-SO$_2$C$_3$H$_7$}$_2$ Ni$^{2+}$ | 552 | 594 |
| 14 | {structure with (H$_3$C)$_3$C, C$_2$H$_5$, C$_2$H$_5$, N-SO$_2$C$_3$H$_7$}$_2$ Ni$^{2+}$ | 531 | 606 |

| Example | Metal chelate compound | $\lambda_{max}$ (nm) of the solution | Absorption maximum or absorption shoulder of the coating film on the longest wavelength side (nm) |
| --- | --- | --- | --- |
| 15 | 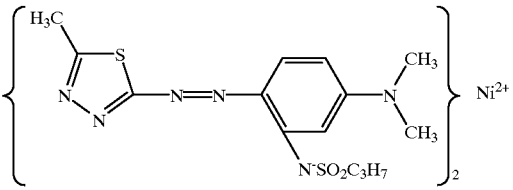 | 537 | 604 |

EXAMPLE 16

Figure 9:
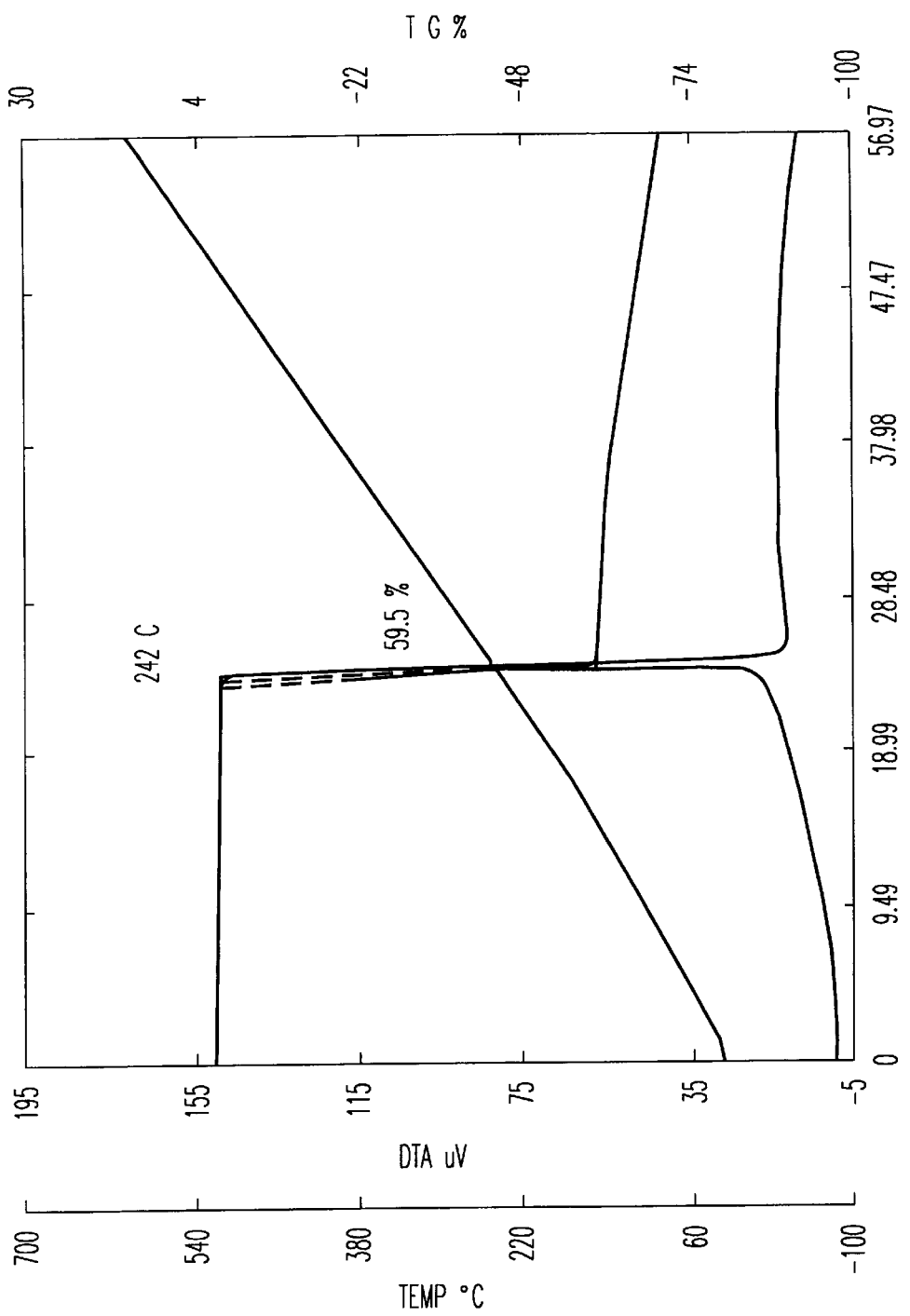
FIG. 9 is a differential thermobalance chart showing the weight reduction characteristic of material B1.
Figure 10:
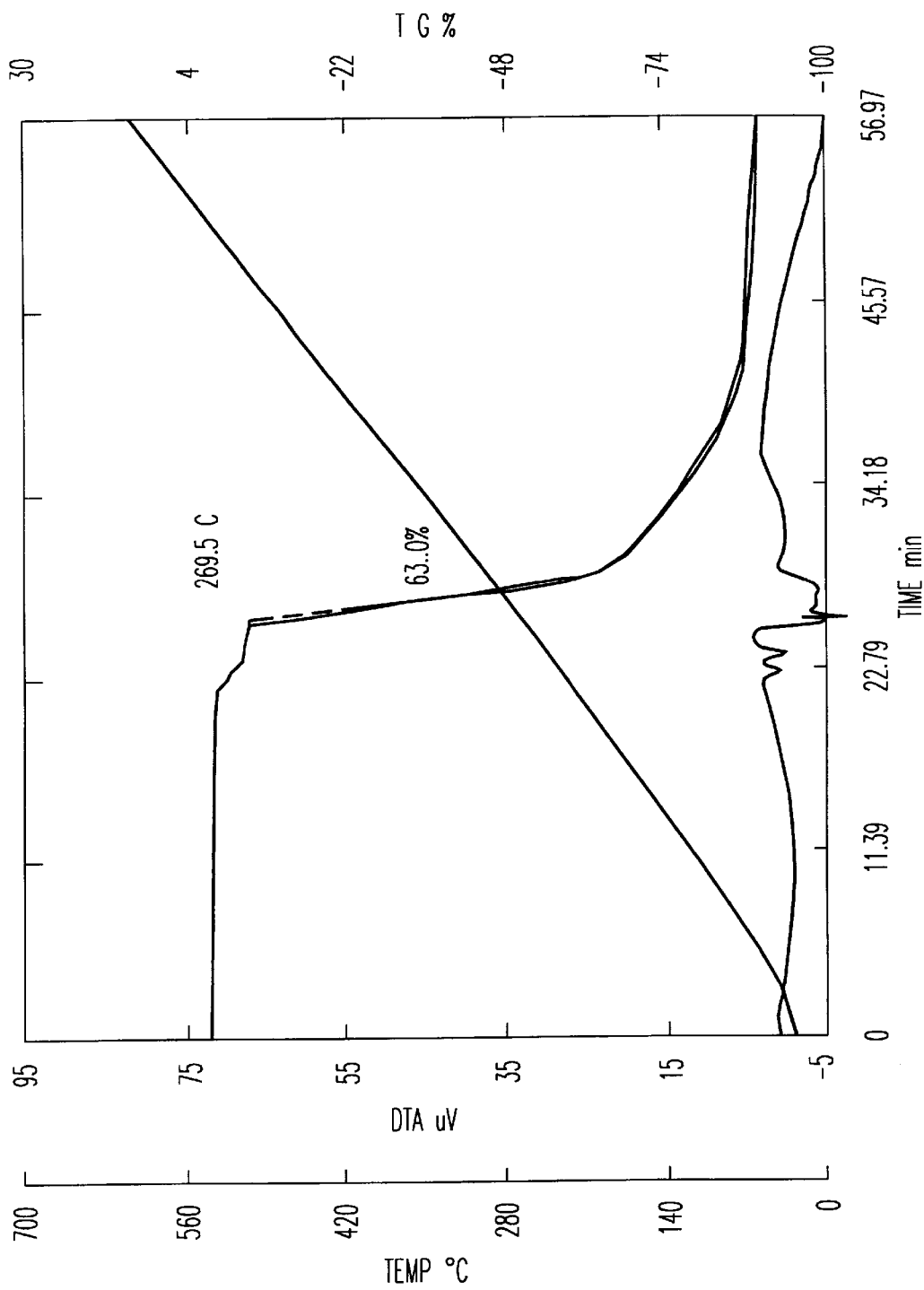
FIG. 10 is a differential thermobalance chart showing the weight reduction characteristic of material B2.
Figure 11:
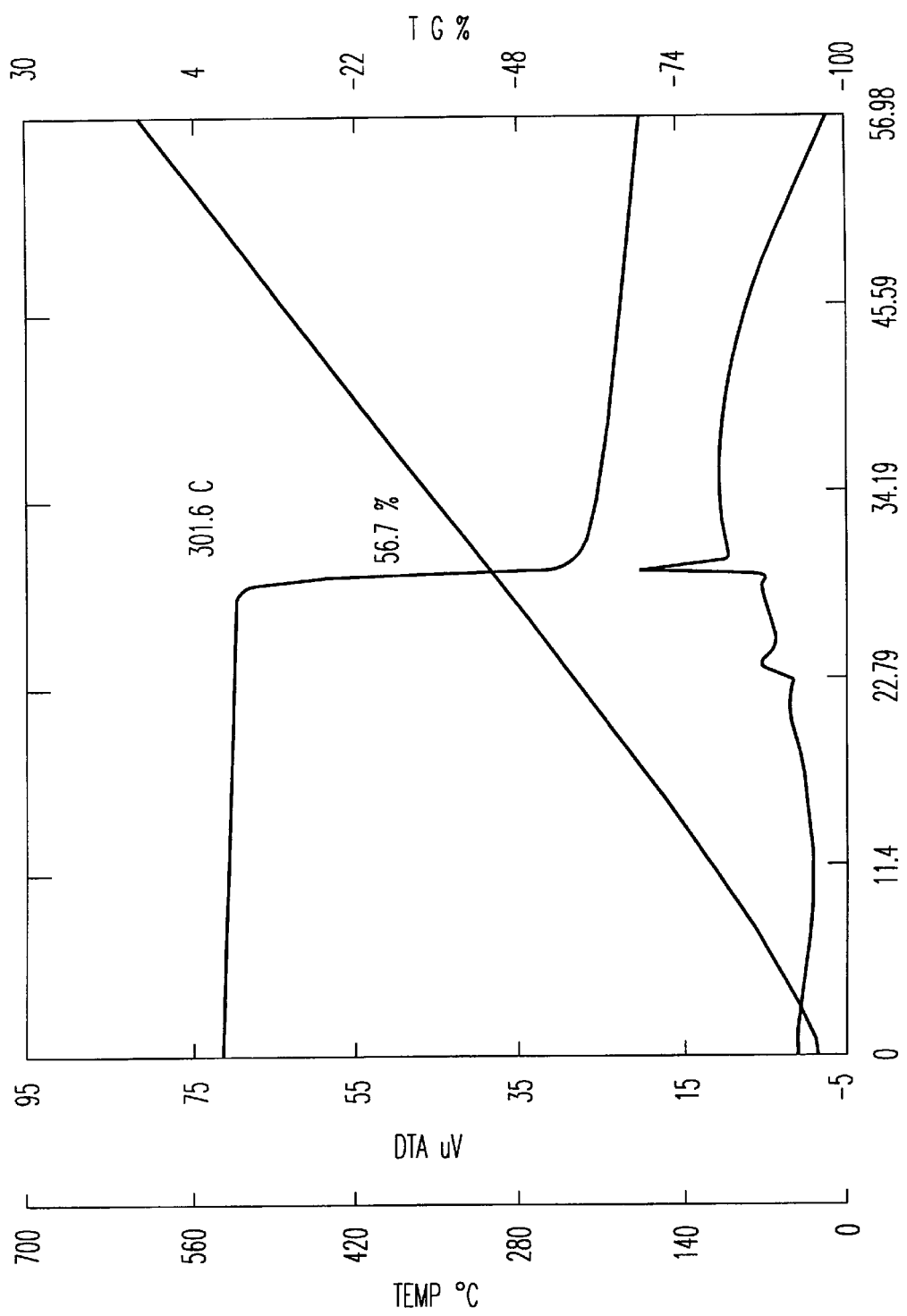
FIG. 11 is a differential thermobalance chart showing the weight reduction characteristic of material B3.
Figure 12:
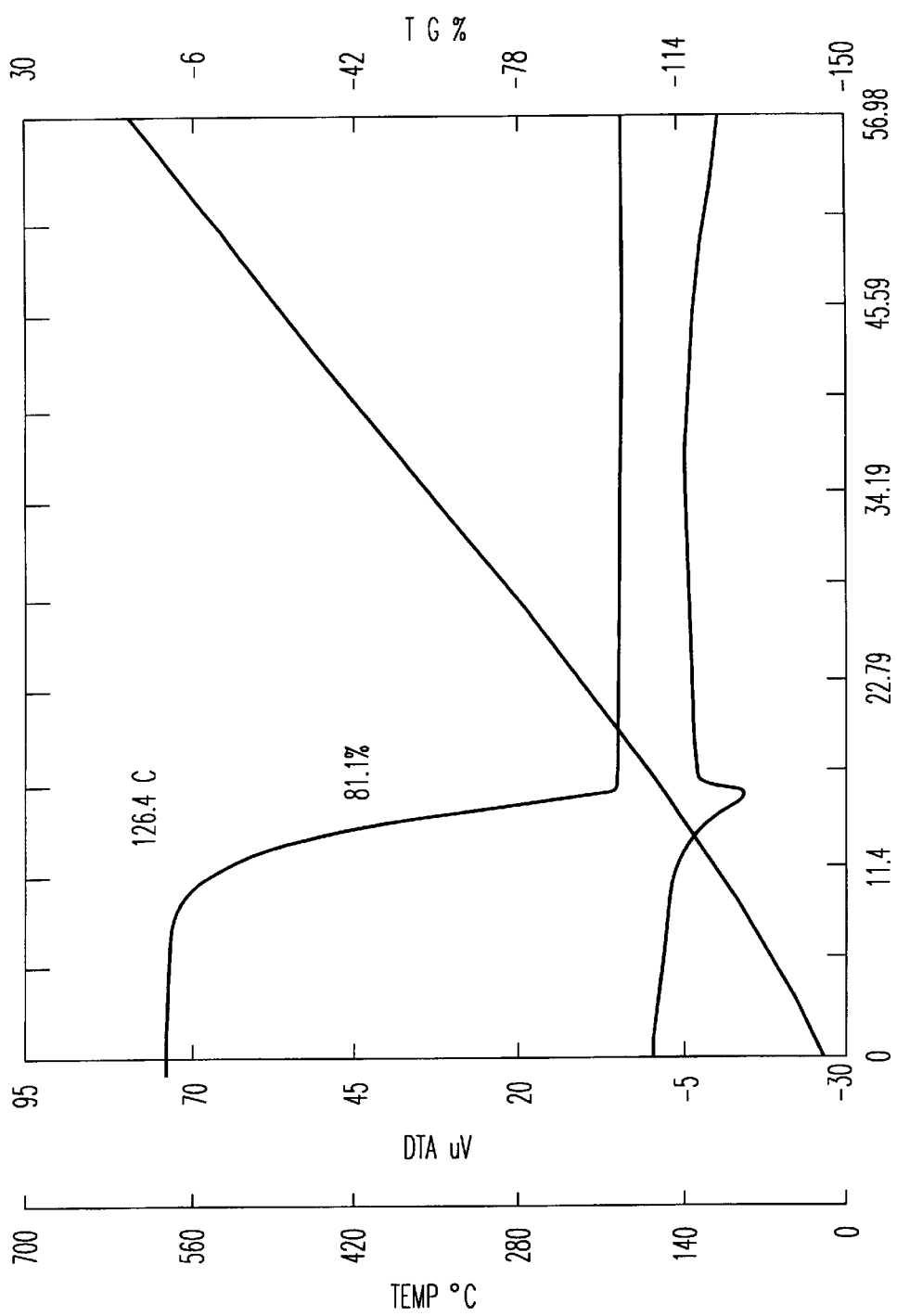
FIG. 12 is a differential thermobalance chart showing the weight reduction characteristic of material B4.
Figure 13:
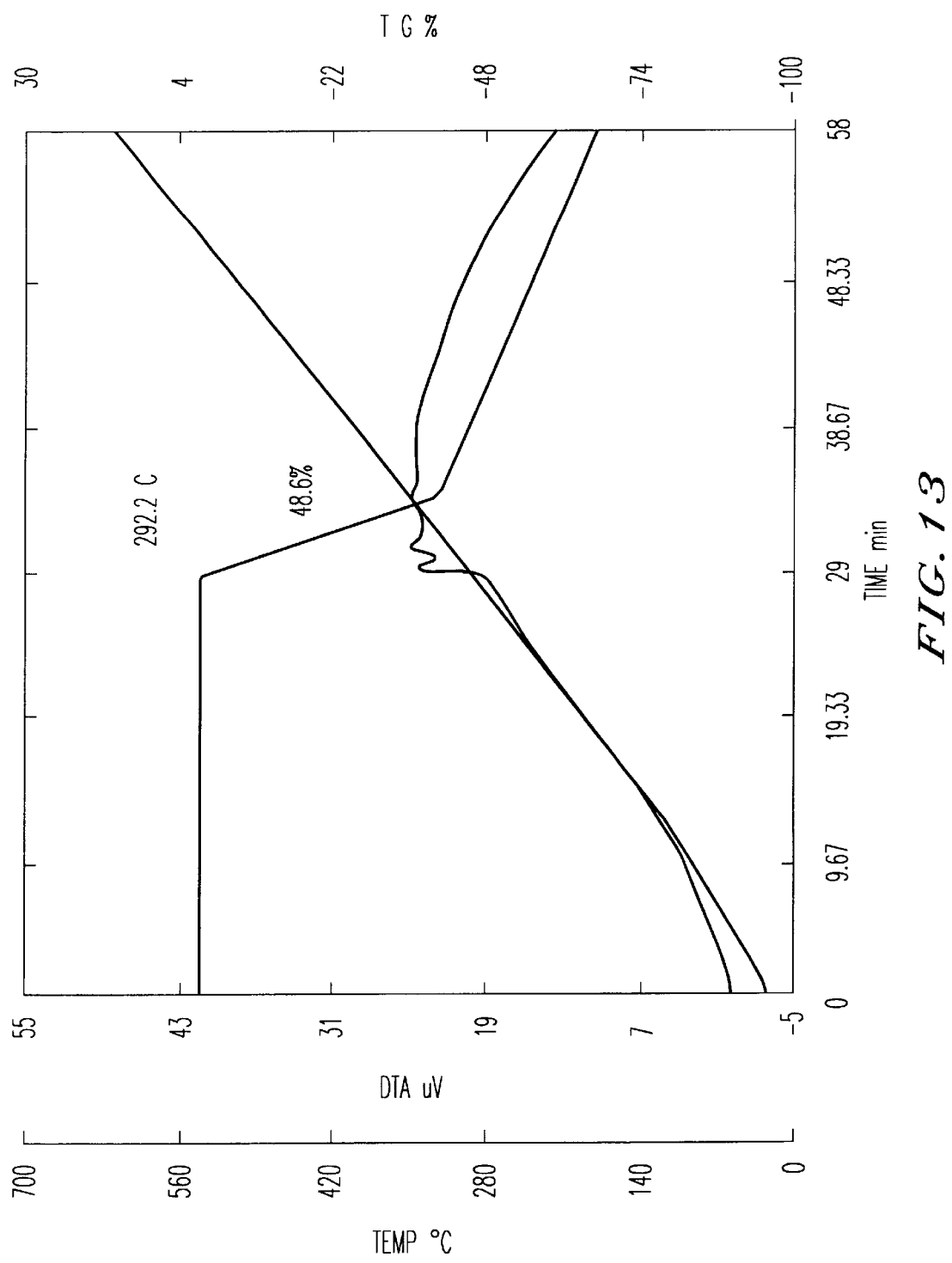
FIG. 13 is a differential thermobalance chart showing the weight reduction characteristic of material B5.
Figure 14:
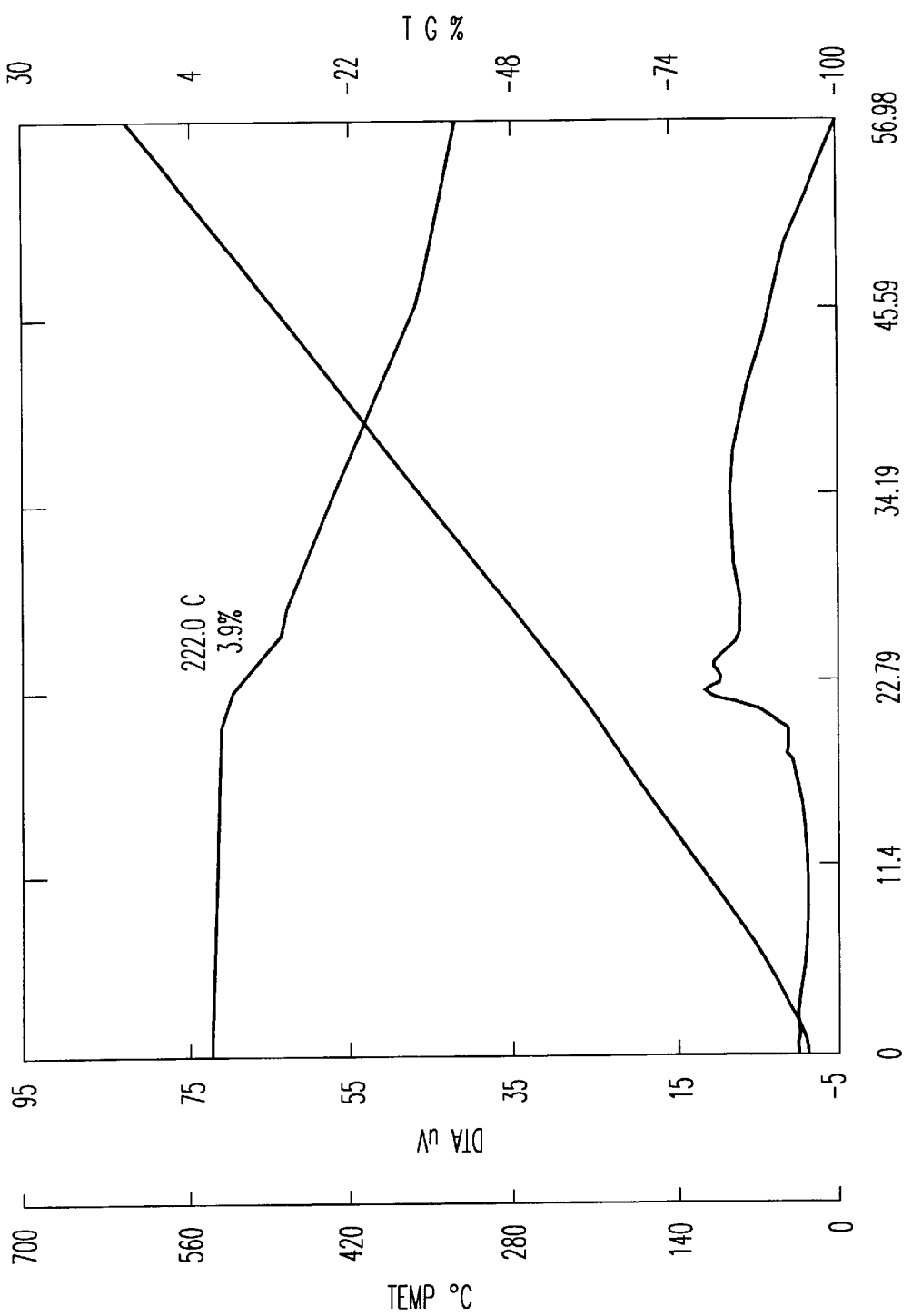
FIG. 14 is a differential thermobalance chart showing the weight reduction characteristic of material B6.
Figure 15:
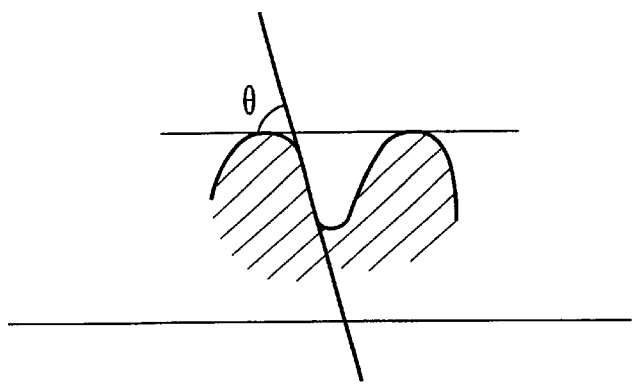
FIG. 15 is a diagrammatical view illustrating the inclination angle θ of the wall of a groove.
Figure 16:
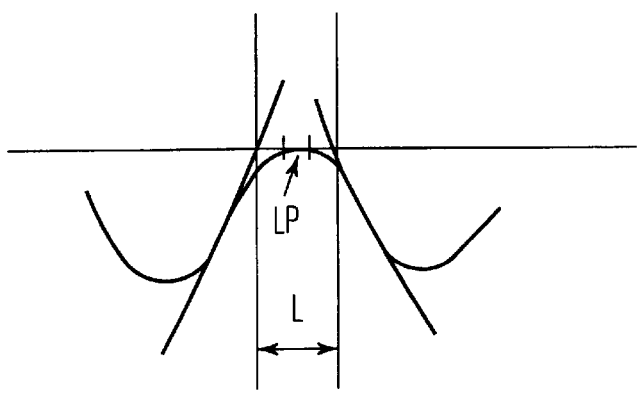
FIG. 16 is a diagrammatical view illustrating the relation between the flat portion (Lp) of a land portion in a substrate and an extrapolated flat portion (L) represented by the distance between intersections of tangential lines of both side walls of a groove and a plane containing the flat portion.

On a polycarbonate substrate having a U-shape guide groove with a depth of 180 nm and a width (a half value width of the groove) of 0.37 μm (0.9 μm pitch), a solution having 0.0495 g of a metal-containing azo dye of the following formula (3) (dye Al):

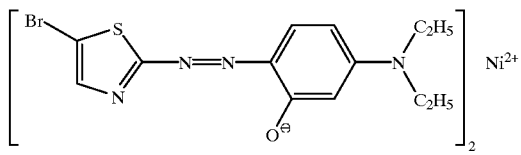
(3)

and 0.0055 g of a metal-containing azo dye of the following formula (4) (material B1):

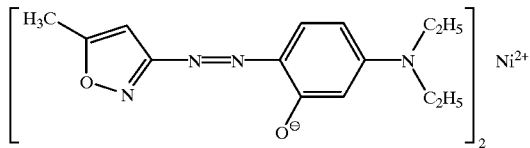
(4)

dissolved in 5 g of octafluoropentanol (OFP) (dye Al: material B1=90:10), was spin-coated at 800 rpm and subjected to anneal treatment for one hour in an oven of 80° C. to form a recording layer. The weight reduction characteristics of this dye A were of the type as shown in FIG. 1. Namely, the total weight reduction in the main weight reduction process was 34%, the temperature difference was 8.2° C. and the inclination of the weight reduction was 4.15%/°C. (initiation temperature of the main weight reduction: 247° C.). The weight reduction characteristics of material B showed a very sharp inclination of the weight reduction and a large weight reduction % (TG %), as shown in FIG. 9. Namely, the total weight reduction in the main reduction process was 58%, the temperature difference was 3.1° C., and the inclination of the weight reduction was 18.7%/°C. (initiation temperature of the main weight reduction: 242° C.). In the main weight reduction process, heat generation was observed. The thermogravimetric analysis was carried out by means of a differential thermobalance ("SSC5200H" series "TG-DTA-320") manufactured by Seiko Denshi Kogyo K.K.

On this recording layer, gold was sputtered in a thickness of 100 nm, and an ultraviolet curable resin ("SD-318", manufactured by Dainippon Ink) was spin-coated in a thickness of about 3 μm thereon, followed by curing by an ultraviolet lamp to obtain a disc. On this disc, recording was carried out in the groove at a linear velocity of 3 m/s by means of a semiconductor laser evaluator (NA=0.6) of 680 nm, whereby with a reproduction power of 0.7 mW at a recording frequency of 3 MHz at a duty ratio of 25% and with a recording power of 10 mW, C/N was 55 dB, the degree of modulation was 40%, and the reflectivity was 60%. Further, by changing the recording power, quadruple speed FEM signal (n−1)T of CD-R was input, and recording was carried out at a linear velocity of 4.8 m/s, 4.0 m/s or 3.8 m/s (hereinafter referred to as the EFM signal property), whereby good resolution between pits was obtained with the jitter at the 3T record portion being 6 ns as the minimum value at each of the linear velocities (shortest mark length: 0.66 μm). In the following, the resolution will be evaluated by seeing how close to the calculated value and how small the shortest mark length (corresponding to the 3T signal) is at the linear velocity of 3.8 m/s which is the severest within the linear velocity range, and how small the jitter is. The closer the measured mark length to the calculated value and the smaller the jitter, the better the properties in high density recording. The film thickness of the recording film is about 120 nm, the groove of the coating film had a U-shape with a depth of 140 nm by STM. The absorption maximum ($\epsilon$=90,000) of the film of dye Al was 619 nm, and the absorption maximum as a film of material B1 was 547 nm.

The substrates and ultraviolet curable resin layers used in the following Examples and Comparative Examples were all the same as in Example 16, and except for Example 21, the reflective layer was gold in a thickness of 100 nm (in Example 21, silver in a thickness of 100 nm), and the recording conditions were the same with respect to all Examples. With respect to all Examples of the present invention, C/N was at least 53 dB, and $I_{11}/I_{top}$ was at least 40%, in recording at a linear velocity of 3 m/s at 3 MHz at a duty ratio of 25%. Further, the reflectivity of each disc was from 40 to 60%.

Table 2 shows the absorption maxima of the films and the thermal properties of the dyes A and materials B in Example 17 et seq. Table 3 shows the ratio of A to B in each Example, film thickness of the recording layer, the minimum value of the 3T jitter of the EFM recording at 3.8 m/s and the mark length (pit length) at that time. The structural formulas of the dye A and the material B used in each Example are shown below, and differential thermobalance charts showing the thermal properties of the materials B are shown in FIGS. 9 to 14. As shown in Table 3, by using a dye having excellent thermal properties (dye A) as the main component, the shortest mark length can be made smaller, and the jitter can be minimized, whereby a further improvement in the properties for a high density recording medium can be expected.

Further, the calculated value of the shortest mark length in the recording signal system in the Examples (Examples 17 to 24 and Comparative Examples 9 to 14) was 0.66 μm at a linear velocity of 3.8 m/s. Further, in each Example, the depth of the groove of the coating film was from 110 to 140 nm, and the film thickness at the groove of the recording layer (the dye layer) was from 90 to 150 nm. Further, n and k of the reflecting metal layer were 0.16 and 3.8, respectively, in the case of gold and 0.14 and 4.4, respectively, in the case of silver. FIG. 10 to FIG. 14 show differential thermobalance charts of B2, B3, B4, B5, B6.

Dye A for Examples 17, 18 and 19 and Comparative Examples 9, 10, 11 and 12 (dye A1)

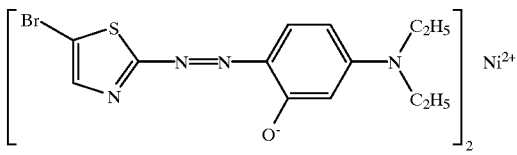

Dye a for Examples 20, 21, 22 and 23 and Comparative Example 13 (dye A2)

TABLE 2

| Dye/material | Absorption maximum* | ε in chloroform | Initiation temp. of the main weight reduction | Temp. difference | TG %** | Inclination of the weight reduction | TG %*** |
|---|---|---|---|---|---|---|---|
| A1 | 619 | 90,000 | 247 | 8.2 | 34 | 4.15 | 34 |
| A2 | 640 | 80,000 | 283 | 13.7 | 15.8** | 1.2 | 50.5*** |
| A3 | 609 | 70,000 | 292 | 64.6 | 40.8** | 0.6 | 44.9*** |
| B1 | 547 | — | 242 | 3.1 | 58 | 18.7 | 58 |
| B2 | 585 | — | 269 | 33 | 60** | 1.8 | 79*** |
| B3 | 565 | — | 302 | 5.49 | 59.8 | 10.9 | 59.8 |
| B4 | 450 | — | 126 | 38 | 81.1 | 2.13 | 81.1 |
| B5 (A3) | 609 | — | 292 | 64.6 | 40.8** | 0.6 | 44.9*** |
| B6 | 590 | — | 222 | 29.6 | 7** | 0.23 | 30*** |

TABLE 3

| Example | Weight ratio of A:B | Wt % of solid content in solvent | Film thickness of the recording layer (nm) in the groove portion | A | B | EFM recording properties at 3.8 m/s Shortest mark length (μm) | 3T jitter |
|---|---|---|---|---|---|---|---|
| Example 17 | 90:10 | 1.1 | about 120 | A1 | B1 | 0.66 | 6.0 |
| Example 18 | 82:18 | 1.1 | about 120 | A1 | B2 | 0.68 | 6.9 |
| Example 19 | 80:20 | 1.2 | about 125 | A1 | B3 | 0.70 | 6.7 |
| Example 20 | 82:18 | 1.1 | about 135 | A2 | B1 | 0.75 | 12.5 |
| Example 21 | 70:30 | 1.2 | about 130 | A2 | B1 | 0.73 | 9.0 |
| Example 22 | 70:30 | 1.2 | about 140 | A2 | B2 | 0.73 | 9.2 |
| Example 23 | 70:30 | 1.2 | about 130 | A2 | B3 | 0.75 | 9.1 |
| Example 24 | 70:30 | 1.2 | about 130 | A3 | B1 | 0.73 | 9.4 |
| Comparative Example 9 | 82:18 | 1.1 | about 120 | A1 | B4 | 0.79 | 8.0 |
| Comparative Example 10 | 90:10 | 1.1 | about 120 | A1 | B5 (A3) | 0.75 | 17 |
| Comparative Example 11 | 90:10 | 1.1 | about 120 | A1 | B6 | 0.75 | 18 |
| Comparative Example 12 (comparing to Example 18) | 100:0 | 0.90 | about 110 | A1 | — | 0.78 | 7.9 |
| Comparative Example 13 (comparing to Example 20) | 100:0 | 0.90 | about 120 | A2 | — | Not decomposable | at least 20 ns |
| Comparative Example 14 (comparing to Example 24) | 100:0 | 0.84 | about 110 | A3 | — | Not decomposable | at least 20 ns |

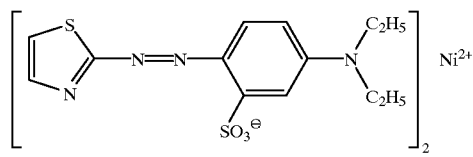

Dye A for Example 24 and Comparative Example 14 (dye A3)

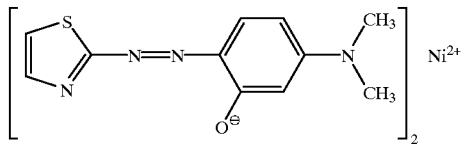

Material B for Examples 17, 20, 21 and 24 (material B1)

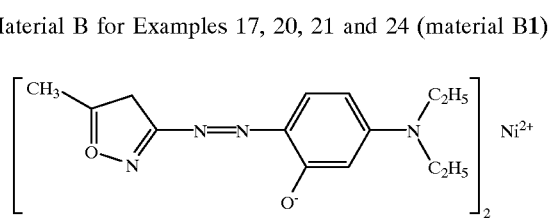

Material B for Examples 18 and 22 (material B2)

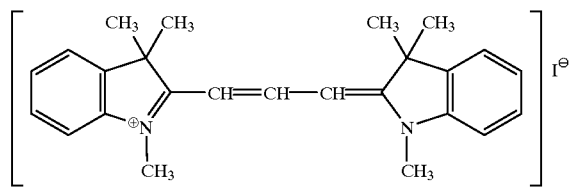

Material B for Examples 19 and 23 (material B3)

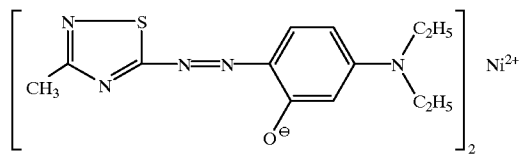

Material B for Comparative Example 9 ferrocene (material B4)

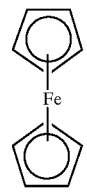

Material B for Comparative Example 10 (material B5=dye A3)

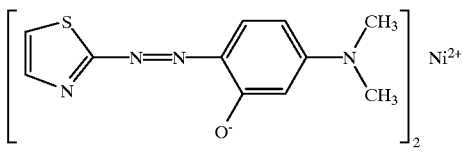

Material B for Comparative Example 11 (material B6)

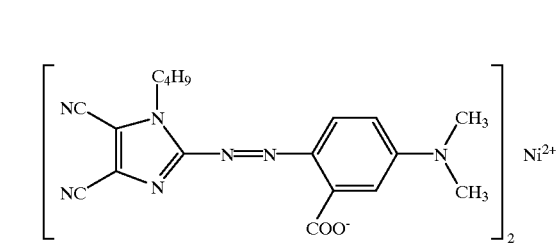

EXAMPLE 25

On a polycarbonate substrate having a guide groove with a depth of 180 nm, a width of 0.37 μm (1.0 μm pitch), an inclination angle of the groove wall of from 75° to 80° and Lp/L=49% (as measured by STM), a solution having 0.036 g of a metal-containing azo dye of the following formula (1):

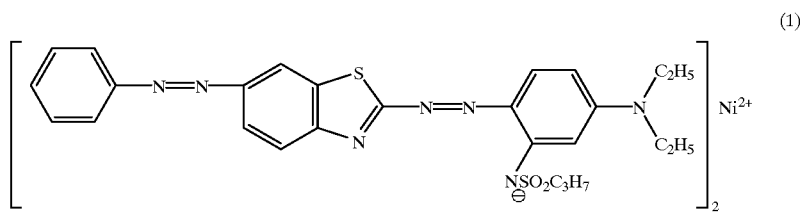

(1)

dissolved in 3 g of octafluoropentanol (OFP), was spin-coated at 800 rpm to form a recording layer. The reason why the inclination angle of the groove wall has a range of from 75° to 80°, is that depending upon the scanning direction of STM, the angle θ of the left hand side wall of the groove is 750° and the angle θ of the right hand side wall is 80°. The weight reduction characteristics of this dye were such that the total weight reduction in the main weight reduction process (initial temperature of the main weight reduction: 280° C.) was 25.2%, the temperature difference was 8.9° C., and the inclination of the weight reduction was 2.8%/°C. The thermogravimetric analysis was carried out by means of a differential thermobalance ("SSC5200H" series "TG-DTA-320") manufactured by Seiko Denshi Kogyo K.K.

On this recording layer, gold was sputtered in a thickness of 60 nm. In this state, the depth of the groove of the recording layer measured by STM was 57% of the depth of the groove in the substrate measured likewise by STM (the film thickness at the groove was 210 nm). An ultraviolet curable resin ("SD-318", manufactured by Dainippon Ink) was spin-coated thereon in a thickness of about 3 μm, followed by curing by an ultraviolet lamp to obtain a disc. On this disc, recording was carried out in the groove at a linear velocity of 3 m/s by means of a semiconductor laser evaluator (NA=0.6) of 680 nm, whereby by recording with a reproducing power of 0.7 mW at a recording frequency of 3 MHz at a duty ratio of 30% with a recording power of 6 mW, excellent record portions were formed, i.e. C/N was 55 dB, the degree of modulation was 48%, an the crosstalk was 30 dB. Here, the crosstalk was (reproduction C/N at the groove record portion—reproduction C/N at the adjacent groove) (dB). Similarly, EFM signal (n−1)T was recorded and reproduced instead of the signal at a recording frequency of 3 MHz. The modulation amplitude of EFM signal was 75%. The film of this disc was removed, and the record portion was inspected by SEM, whereby the width of the groove at the record portion was wider by 33% than the non-record portion. This dye layer had a refractive index n of 2.4 and an extinction coefficient k of 0.15 at 680 nm.

EXAMPLE 26

A disc was prepared in the same manner as in Example 25, except that the amount of the dye was changed to 0.02 g. The depth of the groove of the recording layer was 70% of the depth of the groove in the substrate in a state where no film was formed, as measured by STM (the film thickness at the groove was 160 nm). On this disc, recording was carried out in the groove under the same conditions by means of the same evaluator as used in Example 25 with a recording power of 9 mW, whereby good properties were obtained, i.e. C/N was 45 dB, the degree of recording modulation was 40%, and the crosstalk was 25 dB. Further, the modulation amplitude of EFM signal was 52%. In the same manner as Example 25, the substrate at the record portion was inspected, whereby the width of the groove was wider by 23% than the non-record portion.

EXAMPLE 27

A disc was prepared in the same manner as in Example 25, except that the substrate was changed to a polycarbonate substrate having a guide groove with a depth of 180 nm, a width of 0.33 μm (track pitch: 0.74 μm), an inclination angle of the groove wall of from 77 to 83° and Lp/L=47%, and the reflective layer changed to silver in a thickness of 60 nm. The depth of the groove of the recording layer of this disc was 55% of the depth of the groove in the substrate. This disc was subjected to recording in the groove and reproduction under the same conditions as in Example 25, whereby C/N was 52 dB, the degree of recording modulation was 45% and the crosstalk was 32 dB. Further, the modulation amplitude of EFM signal was 55%. In the same manner as in Example 25, the width of the groove of the substrate at the record portion was inspected by SEM, whereby the width of the groove was wider by 40% than the non-record portion.

COMPARATIVE EXAMPLE 15

A disc was prepared in the same manner as in Example 25 except that the substrate was changed to a polycarbonate substrate having a guide groove with a depth of 90 nm, a width of 0.45 μm (track pitch: 1 μm), an inclination angle of the groove wall of 60° and Lp/L=45%. The depth of the groove of the recording layer was 50% of the depth of the groove in the substrate. Recording was carried out in the same manner as in Example 25, whereby C/N was 30 dB, and the recording modulation amplitude was less than 10%. The deformation of the substrate at the record portion was inspected, whereby the width of the groove of the record portion was not substantially different from the width of the groove of a non-record portion.

COMPARATIVE EXAMPLE 16

A disc was prepared in the same manner as in Example 25 except that the substrate was changed to a substrate with Lp/L=30%, and evaluated in the same manner by the same evaluator of 680 nm, whereby with a recording power of 6 mW, C/N was 30 dB and the degree of recording modulation was 15%, and with a recording power of 13 mW, C/N was 45 dB and the recording modulation amplitude was 25%.

According to the present invention, it is possible to obtain an optical recording medium suitable for short wave recording at a wavelength of from 600 to 700 nm, which has high C/N and a large recording modulation amplitude in a groove having a narrow width.

EXAMPLE A

On a polycarbonate substrate having a thickness of 0.6 mm, a U-shape guide groove with a depth of 150 nm and a width of 0.35 μm (0.8 μm pitch), a solution having 0.050 g of a metal-containing azo dye of the following formula (8):

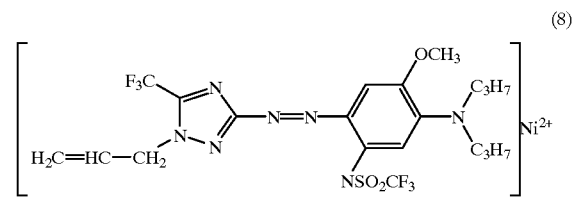

Figure 18:
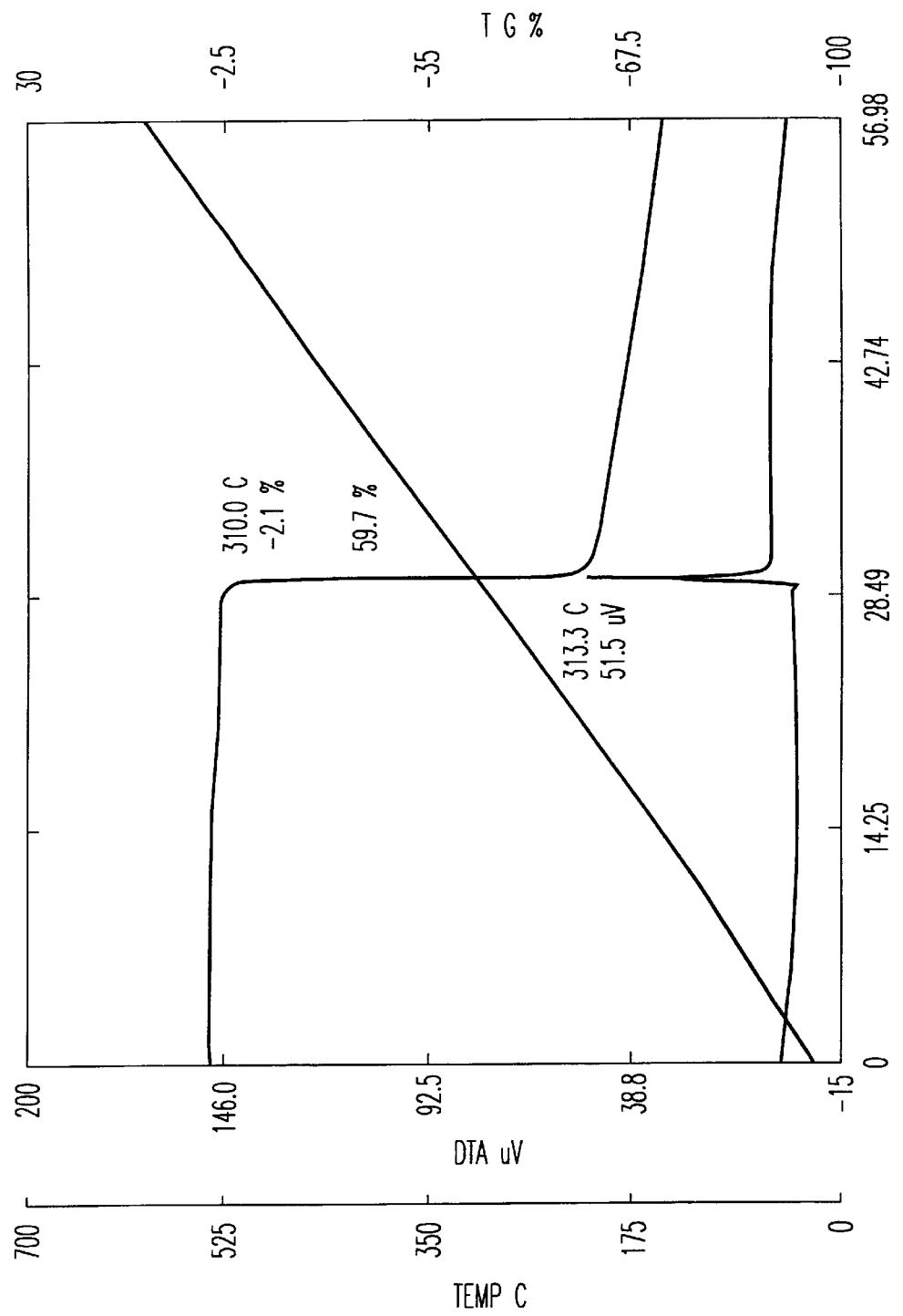
FIG. 18 is a differential thermobalance chart showing the weight reduction characteristic of the dye of Example A.
Figure 19:
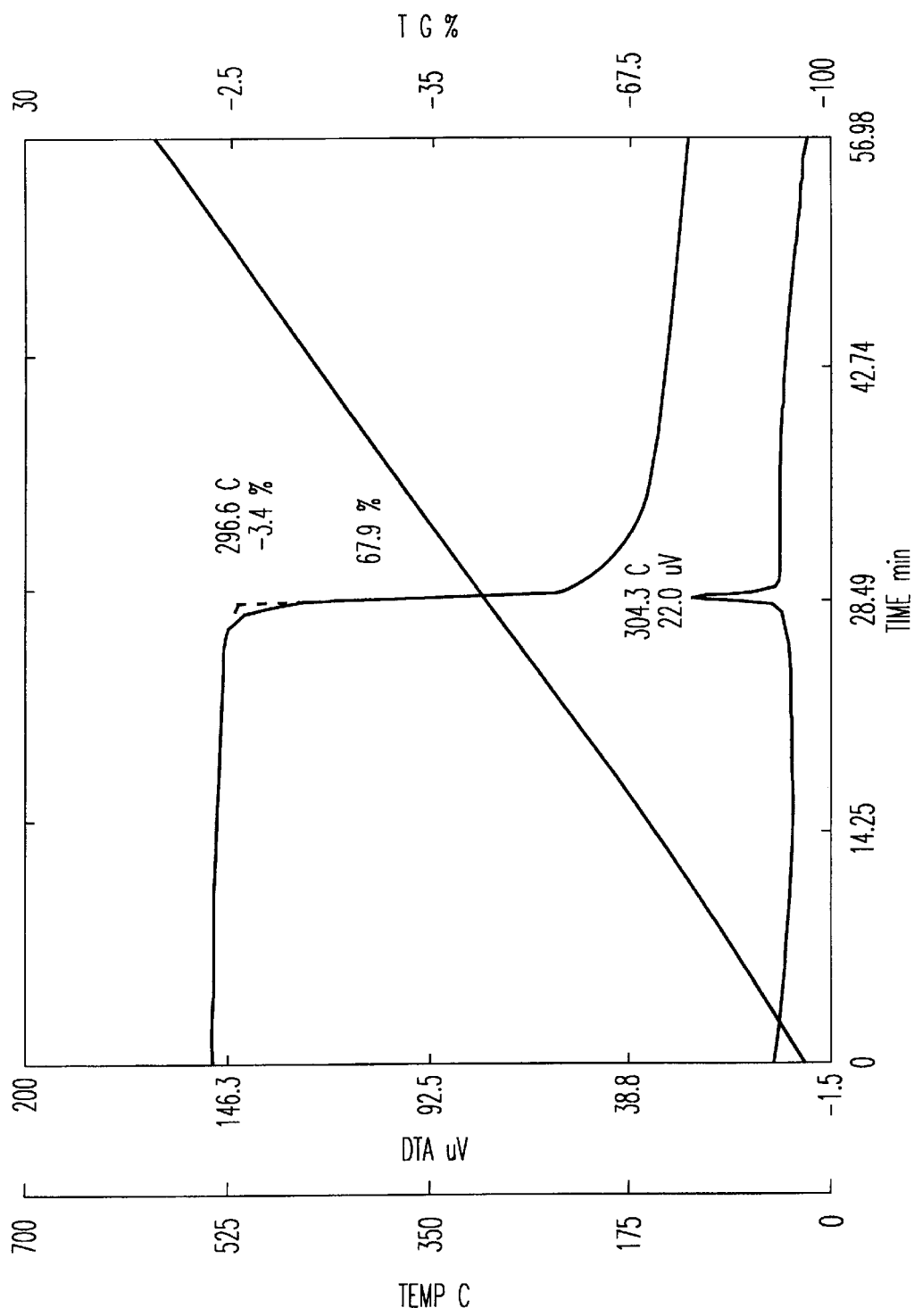
FIG. 19 is a differential thermobalance chart showing the weight reduction characteristic of the dye of Example E.
Figure 20:
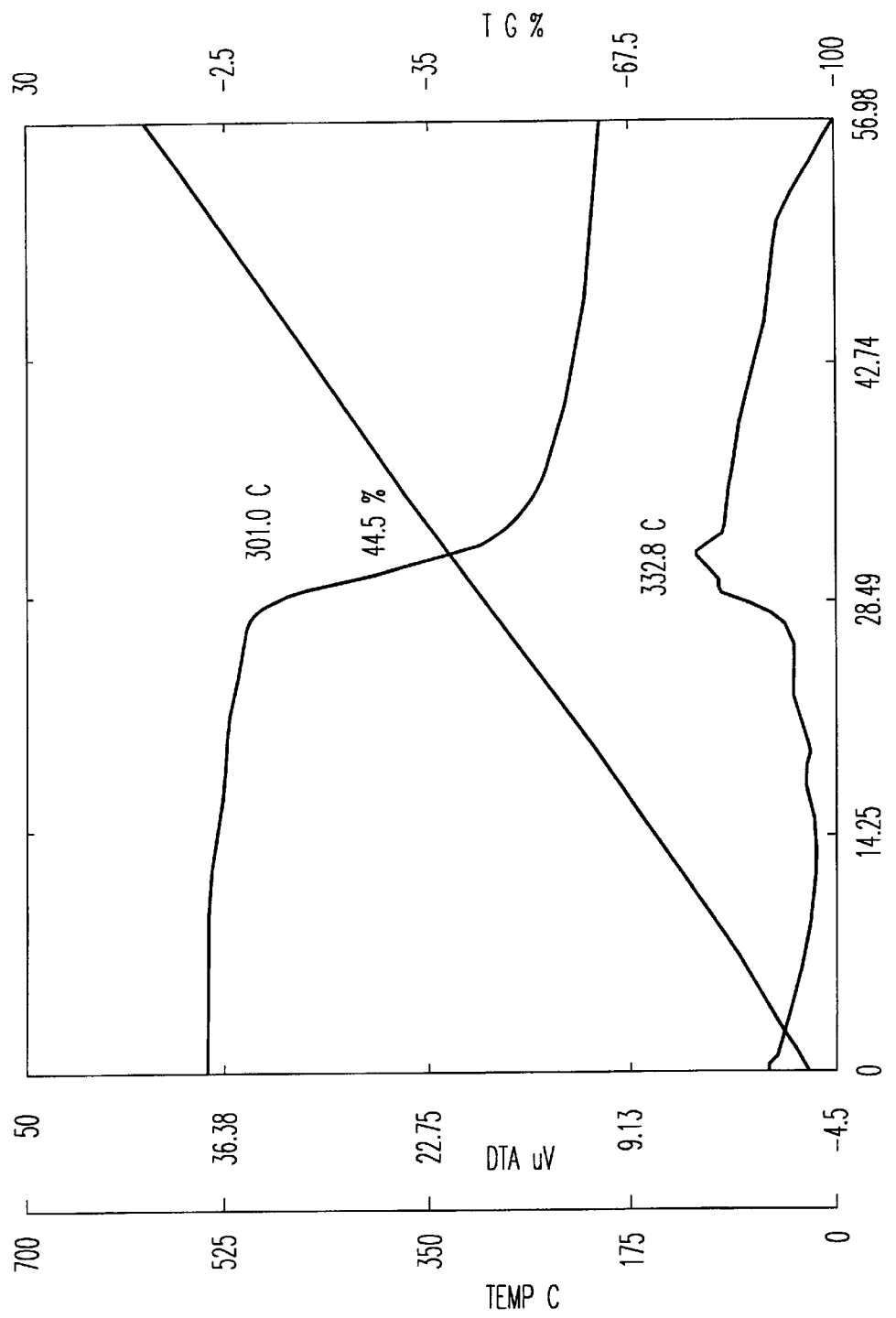
FIG. 20 is a differential thermobalance chart showing the weight reduction characteristic of the dye of Comparative Example A.

(8)

dissolved in 4 g of octafluoropentanol (OFP, boiling point: 140° C.), was spin-coated to form a recording layer having a film thickness of 90 nm (in groove). The depth of the groove of the coating film was 57% of the depth of the groove in the substrate. The weight reduction characteristics of this dye were as shown in FIG. 18. Namely, the total weight reduction in the main weight reduction process was 68.0%, the temperature difference was 3.56° C., and the inclination of the weight reduction was 19.1%/°C. The thermogravimetric analysis was carried out by means of a differential thermobalance ("SSC5200H" series "TG-DTA-320") manufactured by Seiko Denshi Kogyo K.K.

On this recording layer, gold was sputtered in a thickness of 100 nm, and an UV curable resin ("SD-318", manufactured by Dainippon Ink) was spin-coated in a thickness of about 3 μm thereon, followed by curing by an ultraviolet lamp to obtain a disc. This disc was subjected to recording of EFM signal (n−1)T (shortest mark length: 0.44 μm) in the groove at a linear velocity of 3.7 m/sec by a 640 nm semiconductor laser evaluator (NA=0.60), whereby the reflectance on the groove was 47% and the modulation amplitude of EFM signal was 60%, with a reproducing power of 1.0 mW and an optimum recording power of 7.0 mW. Further, the resolution of the EFM signal was good, and the mark jitter of the shortest mark length was 7.0 ns, whereby very good short mark properties were obtained.

In the measuring system, measuring conditions and disc construction in this example, it is expected that the properties tend to be worse if the 3T mark jitter exceeds 10 ns.

The absorption maximum of this dye layer at the short wavelength side which is closest to the reproducing light, was 589 nm.

This recording layer had a refractive index n of 2.35 and an extinction coefficient k of 0.06 at 640 nm. The reflecting layer had a refractive index n of 0.14 and an extinction coefficient k of 3.59 at 640 nm.

The deformation of the substrate by the written mark was inspected by AFM and found that good short pits and long pits having a small width were formed.

EXAMPLE B

A disc was prepared in the same manner as in Example A except that a metal-containing azo dye of the following formula (2):

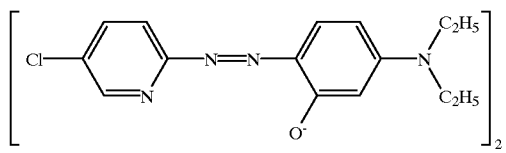

(2)

Recording was conducted under the same conditions as in Example A, whereby the reflectance (on the groove) was 50% and the modulation amplitude of EFM signal was 60% with a recording power of 10 mW. Further, the mark jitter of the 3T mark (0.44 μm) as the shortest mark was 8 ns, whereby good short mark properties were obtained.

The resolution of the EFM signal was good.

EXAMPLE C

A disc was prepared in the same manner as in Example A except that a metal-containing azo dye of the following formula (3):

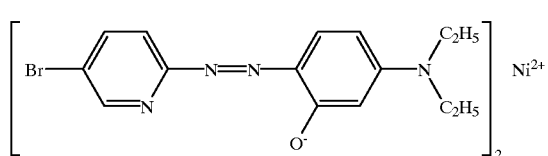

(3)

was used. Recording was conducted under the same conditions as in Example A, whereby the reflectance (on the groove) was 52% and the modulation amplitude of EFM signal was 63% with a recording power of 10 mW. Further, the mark jitter of the 3T mark (0.44 μm) as the shortest mark was 8 ns, whereby good short mark properties were obtained. The resolution of the EFM signal was good.

EXAMPLE D

A disc was prepared in the same manner as in Example A except that the reflecting layer was made of silver.

Recording was conducted under the same conditions as in Example A, whereby the reflectance (on the groove) was 51% and the modulation amplitude of EFM signal was 59% with a recording power of 6.8 mW. Further, the mark jitter of the 3T mark (0.44 μm) as the shortest mark was 9 ns, whereby good short mark properties were obtained.

EXAMPLE E

A disc was prepared in the same manner as in Example A except that a metal-containing azo dye of the following formula (9):

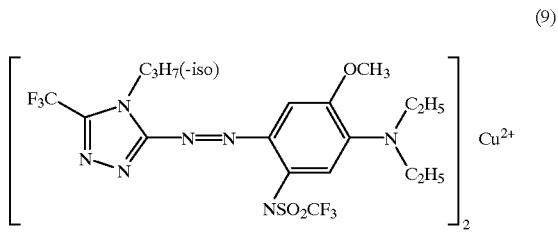

(9)

was used. Recording was conducted under the same conditions as in Example A, whereby the reflectance (on the groove) was 52% and the modulation amplitude of EFM signal was 60% with a reproducing power of 0.6 mW and a recording power of 6.4 mW. Further, the mark jitter of the 3T mark (0.44 μm) was 9 ns, whereby good short mark properties were obtained. The resolution of the EFM signal was good.

The absorption maximum of this dye layer was 589 nm.

The total weight reduction in the main weight reduction process was 56.9%, the temperature difference was 3.65° C., and the inclination of the weight reduction was 15.6%/°C.

COMPARATIVE EXAMPLE A

A disc was prepared in the same manner as in Example A except that a metal-containing azo dye of the following formula (10):

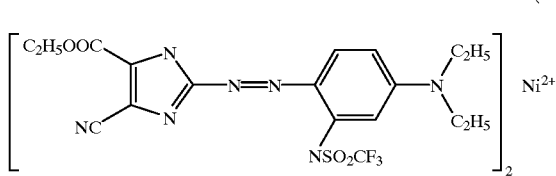

(10)

was used. Recording was conducted under the same conditions as in Example A, whereby the reflectance (on the groove) was 50% and the modulation amplitude of EFM signal was 58% with a recording power of 6.4 mW. Further, the mark jitter of the 3T mark (0.44 μm) was 12 ns, whereby short mark properties were poor. The resolution of the EFM signal was not good.

The absorption maximum of this dye layer was 595.5 nm. The total weight reduction in the main weight reduction process was 46.7%, the temperature difference was 44.5° C., and the inclination of the weight reduction was 1.05%/°C.

What is claimed is:

1. An optical recording medium comprising a transparent substrate and at least a recording layer containing an azo chelate dye and not containing cyanine dye, a reflecting metal layer and a protective layer sequentially laminated on the substrate in this order, which has the following characteristics (a) to (c):

(a) the substrate has a tracking groove with a track pitch of from 0.7 to 1.0 μm and the recording layer shows a modulation amplitude of EFM signal of at least 50% when recording is carried out by a laser beam with a wavelength of from 600 to 700 nm, and has a reflectance of from 45 to 65%;

(b) in a thermogravimetric analysis of the dye, the inclination of the weight reduction to the temperature in the main weight reduction process is at least 13%/°C.; and (c) in the thermogravimetric analysis of the dye, the total weight reduction in the main weight reduction process is at least 25%.

2. The optical recording medium according to claim 1, wherein the azo chelate dye is a metal chelate compound made of a compound of the following formula (1) to (6) and at least one metal selected from the group consisting of nickel, cobalt and copper:

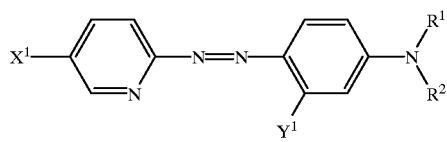
(1)

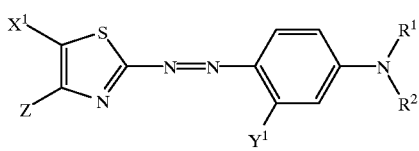
(2)

wherein $X^1$ is a substituent made of an electron attractive group which is conjugative with the diazo group of the formula (1) or (2), $Y^1$ is a hydroxyl group, a carboxyl group or $SO_3M$ (wherein M is a hydrogen atom or an alkaline metal), each of $R^1$ and $R^2$ is a $C_{1-6}$ linear or branched alkyl group, and Z is a hydrogen atom, a halogen atom or a $C_{1-3}$ alkyl group;

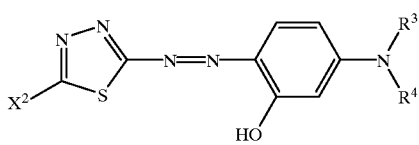
(3)

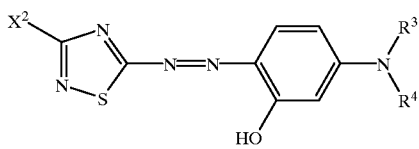
(4)

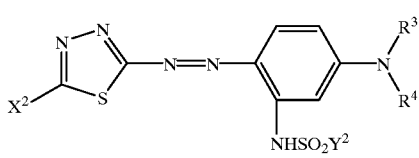
(5)

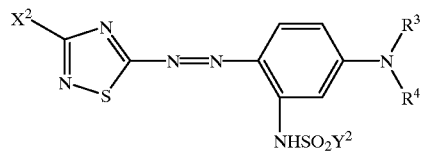
(6)

wherein $X^2$ is a hydrogen atom, a $C_{1-6}$ linear or branched alkyl group or a $C_{3-6}$ cycloalkyl group, $Y^2$ is a linear or branched alkyl group, and each of $R^3$ and $R^4$ is a $C_{1-6}$ linear or branched alkyl group.

3. The optical recording medium according to claim 2, wherein the metal of the metal chelate compound is nickel.

4. The optical recording medium according to claim 2, wherein $X^1$ is a halogen atom.

5. The optical recording medium according to claim 1, wherein the recording layer has a groove with a depth which is from 40 to 75% of the depth of a groove in the substrate.

6. The optical recording medium according to claim 1, wherein the substrate has a tracking groove with the inclination of the wall of the groove in the substrate being from 70° to 85°, and the width of the groove in the substrate being from 0.2 to 0.4 μm as measured at a ½ depth of the groove.

7. The optical recording medium according to claim 6, wherein the width of the groove in the substrate is from 0.25 to 0.37 μm as measured at a ½ depth of the groove.

8. The optical recording medium according to claim 1, wherein the reflecting metal layer has a refractive index n of from 0.1 to 0.2 to a light within a wavelength range of ±5 nm of the recording/reproduction wavelength and an extinction coefficient k of from 3 to 5.

9. The optical recording medium according to claim 1, wherein the reflecting metal layer contains silver as the main component.

10. The optical recording medium according to claim 1, wherein the protecting layer consists of an ultraviolet-cured resin.

11. A method for producing an optical recording medium as defined in claim 1, wherein the azo chelate dye is dissolved in a fluorinated alcohol having a boiling point of from 110° to 150° C. to form the recording layer.

12. The optical recording medium according to claim 1, wherein, in a thermogravimetric analysis of the azo chelate dye, the inclination of the weight reduction to the temperature in the main weight reduction process is at least 15%/°C.

13. The optical recording medium according to claim 1, wherein the azo chelate dye shows absorption such that the molar absorbance coefficient ε in a solution is at least 50,000, and the spectral absorption maximum or absorption shoulder closest to a recording/reproduction wavelength in the form of a film on the transparent substrate is located on a wavelength side shorter by from 40 to 60 nm than the recording/reproduction wavelength.

14. An optical recording medium comprising a transparent substrate having a tracking groove with a track pitch of from 0.7 to 1.0 μm, and at least a recording layer, a reflecting metal layer and a protective layer sequentially laminated on the substrate in this order, wherein the recording layer is made of a mixture comprising a main component azo chelate compound and a material B, wherein when a cyanine dye is present, it is a trimethine cyanine dye, which satisfy the following conditions:

(d) the azo chelate compound is such that in its thermogravimetric analysis, the inclination of the weight reduction to the temperature rise in the main weight reduction process is from 0.5%/°C. to 3%/°C., and the weight reduction in the process is from 40 to 55% of the total weight, or the inclination of the weight reduction is from 3%/°C. to 20%/°C., and the weight reduction is at least 30% and less than 50% of the total weight;

(f) the material B is such that in its thermogravimetric analysis, the inclination of the weight reduction to the temperature rise in the main weight reduction process is at least 10%/°C., and the weight reduction in the process is at least 55% of the total weight, or the weight reduction is at least 75% of the total weight;

(g) the azo chelate compound shows absorption such that the molar absorbance coefficient ε in a solution is at least 50,000, and the spectral absorption maximum or absorption shoulder closest to a recording/reproduction wavelength in the form of a film on the transparent substrate is located on a wavelength side shorter by from 40 to 60 nm than the recording/reproduction wavelength;

(h) the absorption maximum or absorption shoulder closest to a recording/reproduction wavelength, of the material B in the form of a film, is located on a wavelength side shorter by at least 60 nm than the recording/reproduction wavelength.

15. The optical recording medium according to claim 14, wherein the azo chelate compound is a metal chelate compound made of a compound of the following formula (1) to (6) and at least one metal selected from the group consisting of nickel, cobalt and copper:

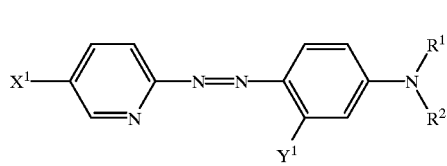
(1)

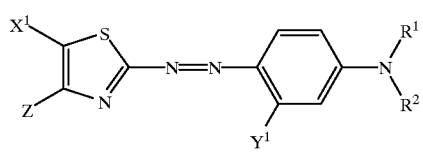
(2)

wherein $X^1$ is a substituent made of an electron attractive group conjugative with the diazo group of the formula (1) or (2), $Y^1$ is a hydroxyl group, a carboxyl group or $SO_3M$ (wherein M is a hydrogen atom or an alkaline metal), each of $R^1$ and $R^2$ is a $C_{1-6}$ linear or branched alkyl group, and Z is a hydrogen atom, a halogen atom or a $C_{1-3}$ alkyl group;

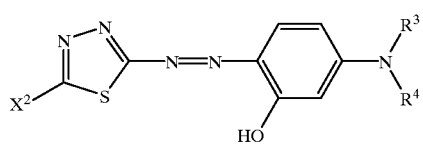
(3)

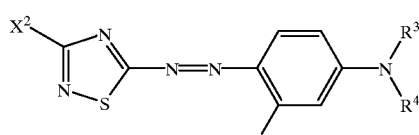
(4)

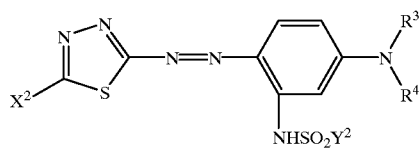
(5)

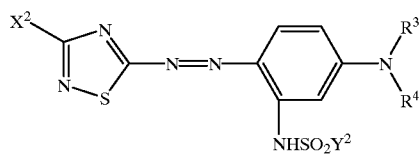
(6)

wherein $x^2$ is a hydrogen atom, a $C_{1-6}$ linear or branched alkyl group or a $C_{3-6}$ cycloalkyl group, $Y^2$ is a linear or branched alkyl group, and each of $R^3$ and $R^4$ is a $C_{1-6}$ linear or branched alkyl group.

16. The optical recording medium according to claim 14, wherein the main weight reduction initiation temperature of the material B is within a range of ±10° C. of the dye A.

17. The optical recording medium according to claim 14, wherein the weight ratio of the material B to the dye A is from 90:10 to 70:30.

18. The optical recording medium according to claim 14, wherein the material B is a metal chelate compound made of a dye of the formula (7) or (8) and at least one metal selected from the group consisting of cobalt, nickel and copper:

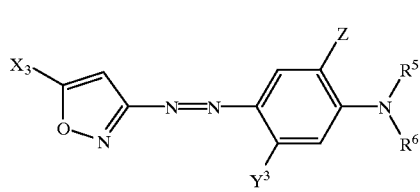
(7)

wherein $X^3$ is a $C_{1-7}$ alkyl group, a branched alkyl group, a cycloalkyl group, $SR^7_3$ or $OR^7_3$ (wherein $R^7$ is a $C_{1-7}$ alkyl group which may have a substituent, a branched alkyl group or a cycloalkyl group), $Y^3$ is a hydroxyl group or $SO_3M$ (wherein M is a hydrogen atom or an alkaline metal), Z is a hydrogen atom, a halogen atom or an alkoxy group, and each of $R^5$ and $R^6$ is a $C_{1-6}$ alkyl group or a branched alkyl group;

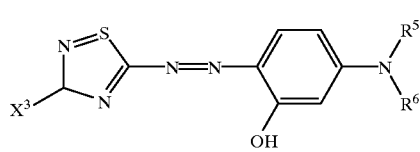
(8)

wherein $X^3$ is a $C_{1-7}$ alkyl group, a branched alkyl group or a cycloalkyl group, and each of $R^5$ and $R^6$ is a $C_{1-6}$ alkyl group or a branched alkyl group.

19. The optical recording medium according to claim 14, wherein the recording layer has a groove with a depth which is from 40 to 75% of the depth of a groove in the substrate.

20. The optical recording medium according to claim 14, wherein, the inclination of the wall of the groove in the substrate being from 70° to 85°, and the width of the groove in the substrate being from 0.2 to 0.4 μm as measured at a ½ depth of the groove.

21. The optical recording medium according to claim 20, wherein the width of the groove in the substrate is from 0.25 to 0.37 µm as measured at a ½ depth of the groove.

22. The optical recording medium according to claim 14, wherein the reflecting metal layer has a refractive index n of from 0.1 to 0.2 to a light within a wavelength region of ±5 nm of a recording/reproduction wavelength, and an extinction coefficient k of from 3 to 5.

23. The optical recording medium according to claim 14, wherein the reflecting metal layer contains silver as the main component.

24. The optical recording medium according to claim 14, wherein the protecting layer is made of an ultraviolet-cured resin.

25. A method for producing an optical recording medium as defined in claim 14, wherein the azo chelate compound is dissolved in a fluorinated alcohol having a boiling point of from 110° to 150° C. to form the recording layer.

* * * * *